United States Patent
Papadopoulos et al.

(10) Patent No.: US 9,467,214 B2
(45) Date of Patent: Oct. 11, 2016

(54) METHOD AND APPARATUS FOR EFFICIENT CHANNEL STATE INFORMATION DISSEMINATION FOR MU-MIMO TRANSMISSION SCHEMES BASED ON OUTDATED CHANNEL STATE INFORMATION

(71) Applicant: NTT DOCOMO, INC., Palo Alto, CA (US)

(72) Inventors: Haralabos Papadopoulos, San Jose, CA (US); Ansuman Adhikary, Los Angeles, CA (US)

(73) Assignee: NTT DOCOMO, INC., Tokyo (JP)

( * ) Notice: Subject to any disclaimer, the term of this patent is extended or adjusted under 35 U.S.C. 154(b) by 7 days.

(21) Appl. No.: 14/425,302

(22) PCT Filed: Mar. 14, 2013

(86) PCT No.: PCT/US2013/031719
§ 371 (c)(1),
(2) Date: Mar. 2, 2015

(87) PCT Pub. No.: WO2014/042684
PCT Pub. Date: Mar. 20, 2014

(65) Prior Publication Data
US 2015/0236766 A1     Aug. 20, 2015

Related U.S. Application Data

(60) Provisional application No. 61/699,729, filed on Sep. 11, 2012.

(51) Int. Cl.
*H04B 7/04* (2006.01)
*H04W 72/04* (2009.01)
*H04L 5/00* (2006.01)
*H04W 88/08* (2009.01)
*H04W 88/02* (2009.01)

(52) U.S. Cl.
CPC ............. *H04B 7/0452* (2013.01); *H04L 5/005* (2013.01); *H04L 5/0053* (2013.01); *H04W 72/042* (2013.01); *H04W 72/0453* (2013.01); *H04W 88/02* (2013.01); *H04W 88/08* (2013.01)

(58) Field of Classification Search
CPC ............ H04B 7/0452; H04W 72/042; H04W 72/0453
USPC ................................................... 370/328, 329
See application file for complete search history.

(56) References Cited

U.S. PATENT DOCUMENTS

| | | | |
|---|---|---|---|
| 2008/0069251 A1* | 3/2008 | Imai | ..................... H04B 7/0413 375/260 |
| 2011/0051636 A1 | 3/2011 | Van Nee et al. | |
| 2012/0027111 A1 | 2/2012 | Vook et al. | |
| 2012/0063336 A1 | 3/2012 | Shany et al. | |
| 2012/0093078 A1 | 4/2012 | Perlman et al. | |

FOREIGN PATENT DOCUMENTS

| | | |
|---|---|---|
| EP | 1 821 444 | 8/2007 |
| WO | 2012/033877 | 3/2012 |
| WO | 2012/040935 | 4/2012 |
| WO | WO 2013/020095 A1 | 2/2013 |

OTHER PUBLICATIONS

PCT Appln. No. PCT/US2013/031719 International Preliminary Report on Patentability, Mar. 26, 2015, 10 pgs.
International Search Report mailed Sep. 6, 2013 for International Application No. PCT/US2013/031719, filed Mar. 14, 2013, 6 pages.
Ahikary, Ansuman, et al., "Multi-user MIMO with outdated CSI: Training, feedback and scheduling", 49th Annual Allerton Conference on Communication, Control, and Computing, Sep. 28, 2011, pp. 886-893.
Written Opinion of the International Searching Authority mailed Sep. 6, 2013 for International Application No. PCT/US2013/031719, filed Mar. 14, 2013, 9 pages.
PCT International Preliminary Report on Patentability from PCT/US2013/031719, mailed Mar. 26, 2015, (10 pages).

Maddah-Ali, M. et al., "Completely stale transmitter channel state information is still very useful," in 48$^{th}$ Annual Allerton Conference on, Communication, Control, and Computing, pp. 1188-1195, Oct. 2010, (19 pages).

Kobayashi, M. et al., "On the Degrees of Freedom of Time Correlated MISO broadcast channel and delayed CSIT," http://arxiv.org/abs/1202,1909, Feb. 2012, (7 pages).

Gou, T., et al., "Optimal Use of Current and Outdated Channel State Information—Degrees of Freedom of the MISO BC with Mixed CSIT," http://arxiv.org/abs/1203.1301, Mar. 2012, (15 pages).

* cited by examiner

*Primary Examiner* — Ronald B Abelson
(74) *Attorney, Agent, or Firm* — Blakely, Sokoloff, Taylor & Zafman LLP

(57) ABSTRACT

A method and apparatus is disclosed herein for channel state information dissemination for multi-user (MU) multiple-input multiple-output (MIMO) (MU-MIMO) transmission schemes based on outdated channel state information. In one embodiment, a method for disseminating channel state information (CSI) coefficients from a first user terminal, where each CSI coefficient corresponds to the CSI previously observed by the first user terminal during transmission resource blocks used by a base station to communicate information to a second set comprising at least one user terminal and not including the first user terminal, comprises: broadcasting by the base station the channel state information (CSI) of each user terminal in the second set of user terminals, on the subset of transmission resources used by the base station to communicate information to each user terminal in the second set; receiving observations of these transmissions by the first user terminal; performing, at first user terminal, eavesdropper channel selection of a subset of CSI coefficients between the base station and the eavesdropping first-user terminal for uplink CSI feedback, the subset chosen out of the set of CSI coefficients between base station and the first user-terminal on the transmission resources used by the base station to communicate information to each user terminal in the second set; scheduling the subset of the selected CSI coefficients for uplink transmission; and transmitting the subset of the selected CSI coefficients via the uplink transmission.

24 Claims, 15 Drawing Sheets

METHOD AND APPARATUS FOR EFFICIENT CHANNEL STATE INFORMATION DISSEMINATION FOR MU-MIMO TRANSMISSION SCHEMES BASED ON OUTDATED CHANNEL STATE INFORMATION

PRIORITY

The present patent application is a U.S. National Phase Application under 35 U.S.C. §371 of International Application No. PCT/US2013/031719, filed Mar. 14, 2013, entitled METHOD AND APPARATUS FOR EFFICIENT CHANNEL STATE INFORMATION DISSEMINATION FOR MU-MIMO TRANSMISSION SCHEMES BASED ON OUTDATED CHANNEL STATE INFORMATION, which claims priority to and incorporates by reference the corresponding provisional patent application Ser. No. 61/699,729, titled, "Method and Apparatus for Efficient Channel State Information Dissemination for MU-MIMO Transmission Schemes based on Outdated Channel State Information," filed on Sep. 11, 2012.

FIELD OF THE INVENTION

Embodiments of the present invention relate to the field of multiuser Multiple Input Multiple Output (MIMO) wireless transmission systems; more particularly, embodiments of the present invention relate to a new class of Multiuser-MIMO (MU-MIMO) techniques that exploit completely outdated channel state information at the transmitter (CSIT).

BACKGROUND

Many recent advances in wireless transmission have rested on the use of multiple antennas for transmission and reception. Multiple antennas, fundamentally, can provide an increase in the numbers of Degrees of Freedom (DoFs) that can be exploited by a wireless system for transmission, i.e., the number of scalar data streams that can be simultaneously transmitted to the receiving parties in the system. Here, DoFs can be used to provide increased spectral efficiency (throughput) and/or added diversity (robustness). Indeed, a Single User MIMO (SU-MIMO) system with $N_t$ transmission antennas serving a single user terminal (UT) with $N_r$ receive antennas may be able to exploit up to $\min(N_t, N_r)$ DoFs for downlink transmission. These DoFs, can under certain conditions be used to improve throughput by a factor that grows linearly with $\min(N_t, N_r)$. Such benefits of MIMO, and increased DoFs, are behind much of the interest in using MIMO in new and future systems.

Exploiting such DoFs often requires some amount of cost to the system. One such cost is knowledge of the channel state between transmitting and receiving antennas. Such Channel State Information (CSI) often has to be available to either the transmitter (such CSI is termed CSIT) and/or to the receiver (such CSI is termed CSIR). The DoFs available also depend on having sufficient "richness" in the channels between transmitting and receiving antennas. For example, SU-MIMO CSIR-based systems such as Bit Interleaved Coded Modulation (BICM) and D-BLAST can achieve the maximum possible DoFs of $\min(N_t, N_r)$ under suitable channel conditions. Under such conditions, they can be used to provide corresponding linear increases in spectral efficiency. Such designs are well understood by those familiar with the state of the art.

Similarly, a Multi-User MIMO (MU-MIMO) system with $N_t$ transmission antennas at the base station (BS) and K single-antenna users ($N_r=1$) can provide up to $\min(N_t, K)$ DoFs. As in the case of SU-MIMO, MU-MIMO can be used to improve throughput linearly with $\min(N_t, K)$.

However, unlike SU-MIMO, many MU-MIMO techniques (in fact most if not all of the prevailing MU-MIMO techniques used and studied for standards) require knowledge of CSIT. MU-MIMO based on CSIT, unlike SU-MIMO based on CSIR, requires additional overheads to estimate CSI and feedback CSI to transmitters before the transmission can even take place (see Caire et al., "Multiuser MIMO achievable rates with downlink training and channel state," in IEEE Transactions on Information Theory, Jun. 2010, pp. 2845-2866). Despite such overheads, MU-MIMO is of practical interest since it has the benefit over SU-MIMO of being able to grow the DoFs without having to add many receive antennas, radio frequency (RF) chains, or increase processing (e.g., decoding) complexity to portable or mobile devices.

The issue of CSI overhead is a fundamental issue that should not be overlooked in assessing such conventional MIMO. In fact, such CSI-related overhead can represent a fundamental "dimensionality bottleneck" that can limit the net spectral efficiency increase that can be obtained with conventional CSI-dependent MIMO. In particular, if one wants to continue to exploit the growth in DoFs (e.g., linear growth) by increasing $N_t$ (or $N_r$ or K), one also has to consider how to support increased system overhead in obtaining the CSI required to formulate transmissions and decode at the receivers. Such overhead can include increased use of the wireless medium for pilots supporting CSI estimation and increased feedback between receiving and transmitting entities on such CSI estimates. As an example, assume that for each complex scalar value that defines the CSI between a single TX antenna and a single RX antenna (this type of CSI is often termed direct CSI by some in the Standards community) a fixed percentage $F_{csi}$ of wireless-channel resources is dedicated to pilots and/or feedback. One can easily see that as the dimension of the CSI required scales with quantities like $N_t$, $N_r$, and/or K, the total CSI system-related overhead grows (e.g., by $N_t \times F_{csi}$). For example, for K single antenna users, each with $N_t$ CSI scalar terms with respect to the transmitting antenna, there are KNT such scalars. Supporting an increase in the dimension of the CSI can take more wireless-channel resources, and reduces the amount of resources left for data transmission. This overhead increase can limit continued growth in throughput if spectral efficiency improvements do not offset increased CSI overheads. Thus, although symbols representing coded data information are used more efficiently, with increased robustness and/or spectral efficiency due to the increased DoFs by MIMO, the net spectral efficiency increases have to account for the CSI overhead. Thus, the net spectral efficiency growth is in fact less than that of individual data symbols as only a fraction of no more than $(1-N_t \times F_{csi})$ of symbols can be used for data.

Recently, a new class of MU-MIMO techniques has emerged, which take advantage of outdated CSIT to enable increases in DoFs via "Interference Alignment" (IA) at each of the receivers. These are referred as "MAT" schemes, named after the initials of the inventors of this family of schemes. These schemes exploit multi-round transmission sessions, referred to as "MAT" sessions. Each round in a MAT session comprises one or more "slots" or resource blocks, over which each user equipment (UE) possibly experiences distinct channels.

What is attractive about these schemes is that the required CSIT is allowed to be fully outdated. In particular, these schemes enable DoF gains by only exploiting knowledge of past channels and rely on no knowledge of the current channel state at the transmitter (i.e., no knowledge at the transmitter is required about the user channels over which transmission is about to take place). This is in sharp contrast to conventional MU-MIMO systems, whose efficacy intimately depends on the accuracy of the CSIT at the time of the data transmission. That is, the efficacy of conventional MU-MIMO intimately depends on how accurately the transmitter knows a priori the channels over which data transmission in MU-MIMO is to take place. It is possible for a Multi-User MIMO (MU-MIMO) system with $N_t$ transmission antennas at the BS and L single-antenna users to achieve $K/(1+1/2+1/3+ \ldots +1/K)$ DoFs with outdated CSIT, where $K=\min(N_t, L)$. As K grows, the system DoFs grow as $K/(\gamma+\log(K))$, where $\gamma$ is the Euler-Mascheroni constant and is number between 0.57 and 0.58.

MU-MIMO schemes based on outdated CSI at the transmitter have some inherent challenges and limitations in the scenarios in which they are used. The first inherent issue is that they often require high Signal to Noise Ratios (SNR) to operate effectively. For example, the original interference alignment (IA) scheme may require up to 20 dB of SNR. This is due to a property of the interference alignment process, which results in noise being amplified in the resulting interference-aligned streams. As a consequence of this, the original IA technique has limited application to many users in a cellular environment. For example, cell-edge users in conventional cellular often experience Signal-to-Interference-plus-Noise-Ratios (SINR) on the order of 0 dB or less, due to the interference coming from interfering cells not serving the K users. Many users, not just cell-edge users, do not have SINRs on the order of 20 dB or more. Because these schemes however can rely on completely outdated CSI, these schemes have less stringent requirements for user scheduling based on the collected CSIT.

Other techniques have been proposed for scheduling and MU-MIMO transmission based on outdated channel state information. One technique enables scheduling MAT sessions with improved rate-performance benefits. Other techniques, referred to as packet-centric eavesdropper-scheduling embodiments, enable even higher scheduling benefits, by scheduling of multi-round multiuser transmissions, which conform to the MAT session principles, without comprising MAT sessions.

Much like their conventional MU-MIMO counterpart, MU-MIMO schemes based on outdated CSI have CSI dissemination requirements. First, these schemes also require CSIT, that is, the CSI of eavesdropping user-terminals, i.e., terminals eavesdropping on the transmission of information to one or more other terminals, is needed at the base station, to enable MU-MIMO transmission in later-round transmissions. Their raw CSIT overheads also increase in the presence of scheduling, as eavesdropper CSI is needed from more user terminals during each slot to allow choosing a "good" eavesdropper and enabling scheduling benefits.

Unlike their conventional MU-MIMO counterparts, MU-MIMO schemes with outdated CSI (with and without scheduling) also require CSIR dissemination, that is, CSI of eavesdropping user-terminals needs to be made available to the user terminals for which the transmissions were intended, so as to allow these terminals to perform coherent detection and decoding.

SUMMARY OF THE INVENTION

A method and apparatus is disclosed herein for channel state information dissemination for multi-user (MU) multiple-input multiple-output (MIMO) (MU-MIMO) transmission schemes based on outdated channel state information. In one embodiment, a method for disseminating channel state information (CSI) coefficients from a first user terminal, where each CSI coefficient corresponds to the CSI previously observed by the first user terminal during transmission resource blocks used by a base station to communicate information to a second set comprising at least one user terminal and not including the first user terminal, comprises: broadcasting by the base station the channel state information (CSI) of each user terminal in the second set of user terminals, on the subset of transmission resources used by the base station to communicate information to each user terminal in the second set; receiving observations of these transmissions by the first user terminal; performing, at first user terminal, eavesdropper channel selection of a subset of CSI coefficients between the base station and the eavesdropping first-user terminal for uplink CSI feedback, the subset chosen out of the set of CSI coefficients between base station and the first user-terminal on the transmission resources used by the base station to communicate information to each user terminal in the second set; scheduling the subset of the selected CSI coefficients for uplink transmission; and transmitting the subset of the selected CSI coefficients via the uplink transmission.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
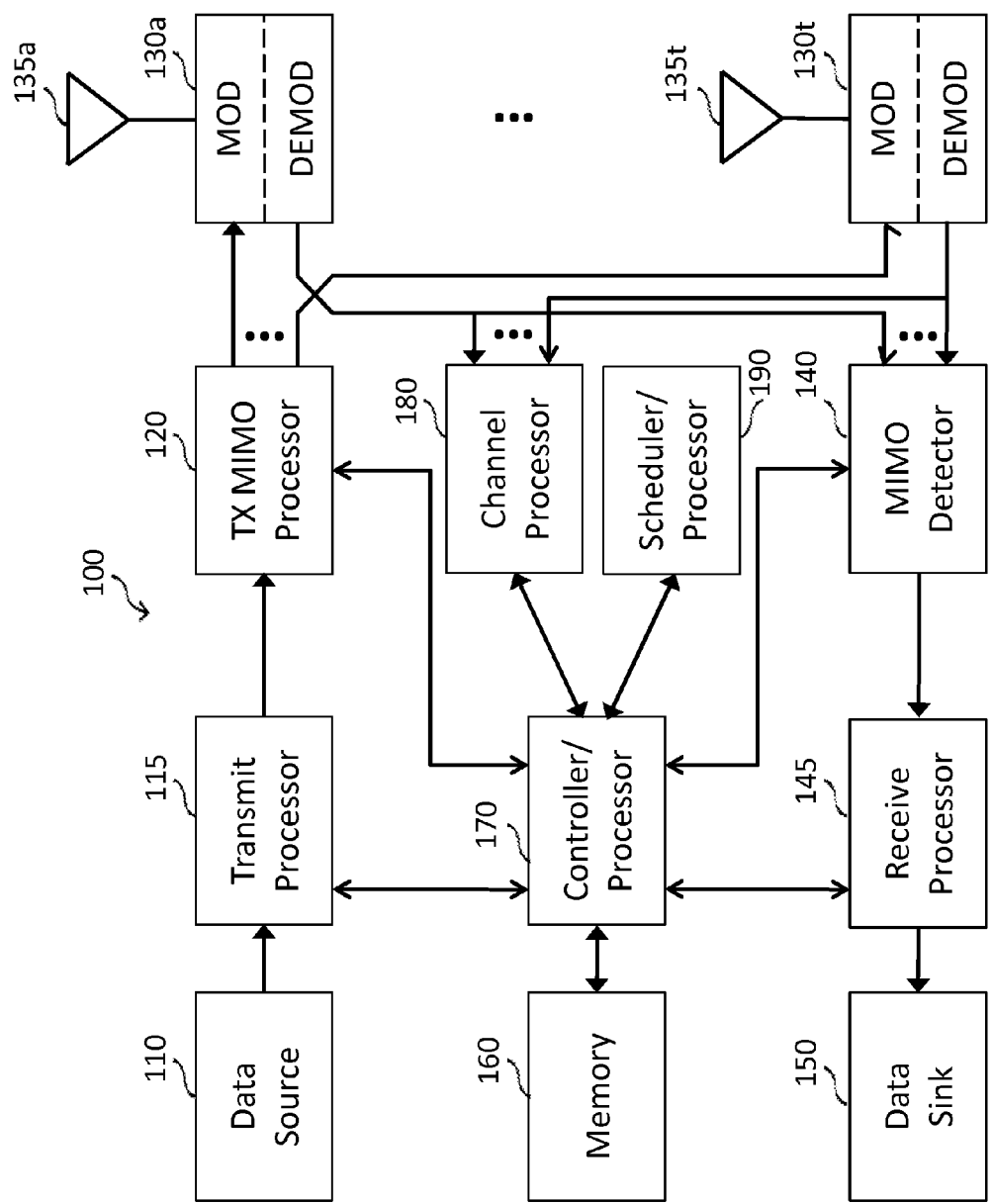
FIG. 1 is a block diagram of one embodiment of a base station.

Embodiments of the invention include methods and apparatuses for efficient delivery of CSIT and CSIR, so as to enable MU-MIMO based on outdated CSI. These techniques can be also readily used for enabling MU-MIMO based on partially outdated CSI. MU-MIMO is a future radio access technology that enables multiplexing gains in environments that involve serving mobile users with delay tolerant traffic.

Although existing control information dissemination methods can be used to disseminate channel state information needed for enabling MU-MIMO based on outdated CSI, as explained herein, these fail to exploit the side information available at each user terminal, and the relaxed timing constraints associated with these inventions. Furthermore, the proposed techniques can offer enormous reductions in the required CSI overheads. As described herein, embodiments of the invention can provide substantial efficiency benefits with respect to existing control information dissemination methods.

Also disclosed are efficient CSI dissemination techniques for enabling scheduling benefits in MU-MIMO based on outdated CSI. Embodiments of the present invention also provide efficient methods for terminal-driven selective eavesdropper-CSIT transmission for MU-MIMO embodiments with scheduling. This reduces the CSIT overhead, as part of the user-channel selection for scheduling is performed at the mobiles prior to CSIT transmission.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of the invention include methods and apparatuses for efficient channel state information dissemination in order to enable MU-MIMO transmission based on outdated CSI. In one embodiment, the techniques set forward in embodiments of the invention are used to enable the original MAT scheme discussed above, scheduling-based MU-MIMO with outdated CSI, as well as the more recent methods for MU-MIMO based on partially outdated CSI.

Similar to conventional MU-MIMO, schemes relying on outdated CSI also require channel state-information (CSI) at the transmitter (CSIT). In conventional MU-MIMO, CSIT is required to design the precoder to be used for MU-MIMO transmission. The efficacy of the MU-MIMO transmission is dictated by how accurately the CSIT, collected during training (e.g., during the transmission of reference signaling), describes the channel during the time of MU-MIMO transmission. As a result, in conventional MU-MIMO, the CSIT collected during reference signaling at each UE (considered for MU-MIMO transmission), must be fed back to the base station in a very timely fashion, i.e., within the coherence time of the channel, so that it accurately describes the user channels experienced during the MU-MIMO data transmission phase. MU-MIMO methods also require accurate CSIT. However, the accuracy of CSIT is measured with respect to the channels where CSI was collected, and not with respect to the future instances where this CSIT will be used for transmission at the base station. As a result, the strict timing constraints of conventional MU-MIMO in delivering CSIT are not present with outdated CSI. This flexibility allows for more options in delivering CSIT for outdated CSI schemes.

In MU-MIMO methods based on outdated CSI, the CSIT, and in particular, a channel coefficient made available to the base station from any given UE, may also need to be made available to one or more of the other UEs. This form of CSI at the receiver (CSIR) is needed to enable such UEs to perform coherent decoding of the messages intended for them. Similarly to CSIT, CSIR dissemination has no timing constraints, other than the timing constraints of the transmitted message sources. In the presence of delay-tolerant traffic (where outdated CSI techniques would be attractive), there is significant flexibility in delivering CSIR. Furthermore, the fact that each user has a piece of CSIR needed by other users can be exploited for further efficacy improvements in the CSIR dissemination.

Note that for purposes herein, the terms user equipment (UE) and user terminal (UT) are used interchangeably.

Figure 2:
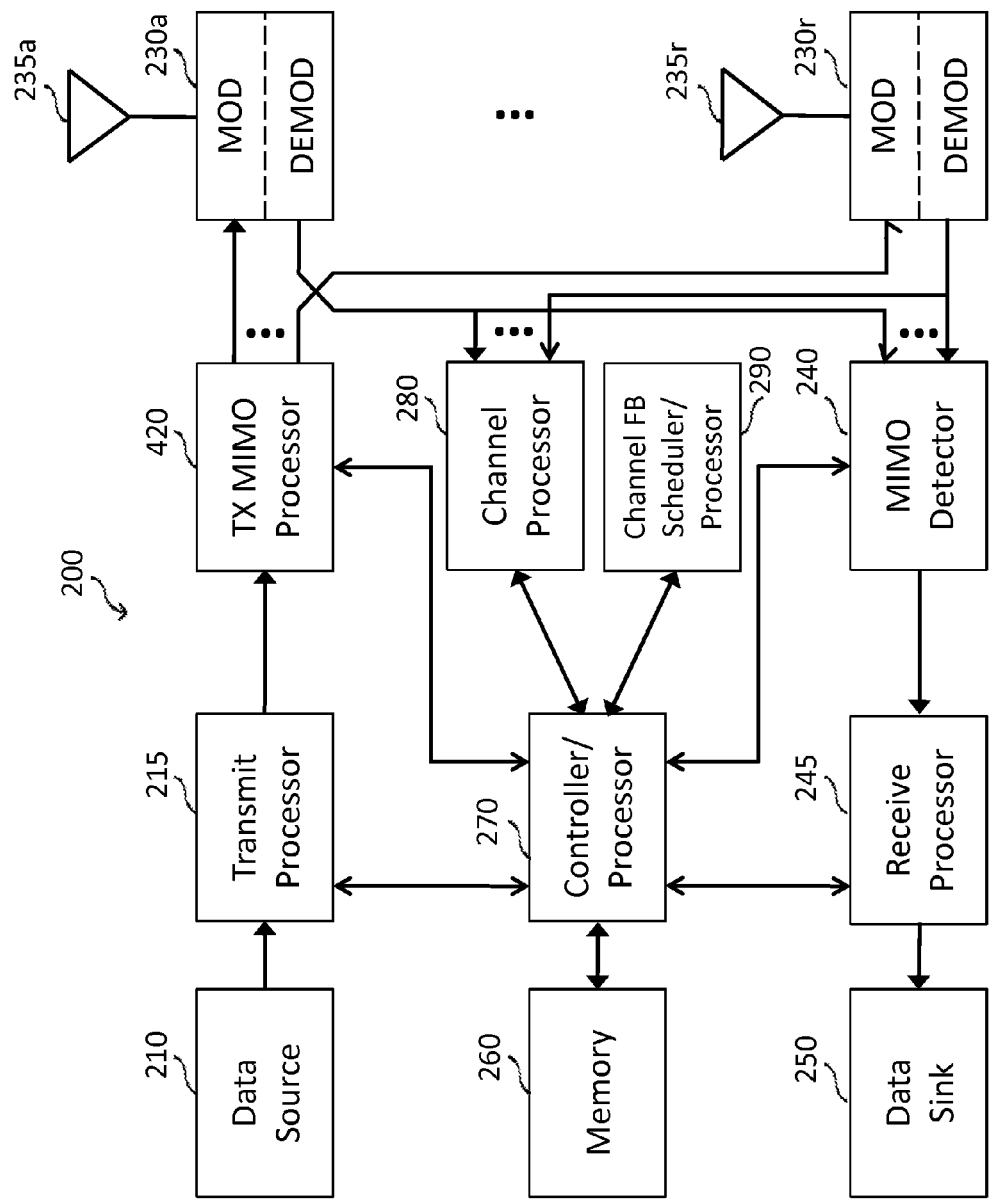
FIG. 2 is a block diagram of one embodiment of user equipment (UE).

FIG. 1 and FIG. 2 are block diagrams of one embodiment of a base station/eNB 100 and UE 200, respectively.

Referring to FIG. 1, in one embodiment, base station 100 serves one or more cells and is equipped with $N_t$ antennas, 135$a$ through 135$t$. In FIG. 2, in one embodiment UE 200 is equipped with $N_R$ antennas, 235$a$ through 235$r$.

Referring back to FIG. 1, base station 100 includes a transmit processor 115 that receives data for one or more UE from a data source 110, processes the data for each UE, and transmits data for each UE. In one embodiment, processor 115 also receives and processes information from a controller processor 170 and provides control symbols. In one embodiment, processor 115 also generates reference symbols for one or more reference signals. A transmit (TX) MIMO processor 120 performs precoding on the data symbols, the control symbols, and/or the reference symbols for each UE based on one or more precoding vectors determined for that UE. In one embodiment, processor 120 provides (up to) $N_t$ output streams, one to each of the modulators (MODs) in modules 130$a$ through 130$t$. Each modulator 130 processes its respective stream (e.g., for OFDM, etc) to obtain an output sample stream. Each modulator 130 further processes (e.g., convert to analog, amplify, filter, upconvert, etc.) the output sample stream to obtain a downlink signal. Up to $N_t$ output streams from modulators 130$a$ through 130$t$ are transmitted via $N_t$ antennas 135$a$ through 135$t$, respectively.

Referring to FIG. 2, in one embodiment, at UE 200, antennas 235$a$ through 235$r$ receive downlink signals from base station 100, other base stations, as well as uplink transmission signals from other UEs. Antennas 235$a$ through 235$r$ provide received signals to demodulators (DEMODs) 230$a$ through 230$r$, respectively. In one embodiment, each demodulator 230 conditions (e.g., amplify, downconvert, digitize) a respective received signal to obtain input samples. In one embodiment, each demodulator 230 further processes the input samples (e.g., for OFDM, etc) to obtain received samples. A receive processor 245 processes (e.g., demodulate and decode) the detected symbols, provides decoded data for UE 200 to a data sink 250, and provides decoded control information to a control processor 270. In accordance with one embodiment of the invention, receive processor 245 also processes (e.g., demodulate) samples of transmissions not intended for UE 200 and provides the samples to a control processor 270. Control processor 270 stores the samples in a memory module 260.

A channel processor 280 at UE 200 estimates the channel response for each cell of interest and provides a channel matrix for the cell. Processor 270 and/or 280 determines channel information based on channel matrix for each cell of interest. In accordance with one embodiment of the invention, this operation also occurs on transmission resources not allocated to transmission of data for UE 200. In that case, processor 280 stores determined channel matrix in memory module 260, for later use.

On the uplink, at UE 200, a transmit processor 215 receives data from a data source 210 and control information from controller/processor 270. Processor 215 processes (e.g., encode and modulate) the data and control information to obtain data symbols and control information respectively. In one embodiment, processor 215 also generates reference symbols for one or more reference symbols. In one embodiment, the symbols from transmit processor 215 are precoded by a TX MIMO processor 220 if applicable, further processed by modulators 230$a$ through 230$r$, and transmitted to base station 100, and possibly other base stations, and possibly other UEs receiving uplink transmissions.

Referring back to FIG. 1, at base station 100, the uplink signals from UE 200 and other UEs are received by antennas 135, processed by demodulators 130, detected by a MIMO detector 140 and further processed by a receive processor 145 to obtain decoded data and control information sent by UE 200 and other UEs. Processor 145 provides the decoded data to a data sink 150 and the decoded control information to controller/processor 170. In one embodiment, processor 145 also provides "analog-valued" (digitized samples with e.g., up to floating point precision) control information transmitted by one or more UEs, indicative of channel state information between one or more antenna elements at the UEs and one or more antennas at the base station.

A channel processor 180 at base station 100 estimates the channel response from UE 200 and other UEs of interest and provides a channel matrix for each UE. In one embodiment, processor 170 and/or 180 determines channel information based on channel matrix for each UE of interest. In accordance with one embodiment of the invention, processor 180 stores determined channel matrix in memory module 160, for later use.

In one embodiment, scheduler 190 schedules UEs for data transmission on the downlink and/or uplink. Scheduler 190 and/or other processors and modules at base station 100 may perform processes for the techniques described herein. These include, scheduling transmission of control information in the uplink by UE 200 and other UEs, in a manner that enables the efficient control information dissemination required to enable MU-MIMO transmission based on outdated CSI with or without scheduling benefits. Some embodiments of this invention can be enabled by a scheduler/processor module 290 at UE 200. This module may perform processes for the techniques described herein, including embodiments of the inventions that are associated with terminal-driven selective feedback of control information pertaining to channel matrices at UE 200 during transmission resources dedicated to transmission to UEs other than UE 200.

Controllers/processors 170 and 270 direct the operation at base station 100 and UE 200, respectively. Memories 160 and 260 may store data and program codes for base station 100 and UE 200, respectively.

Figure 3:
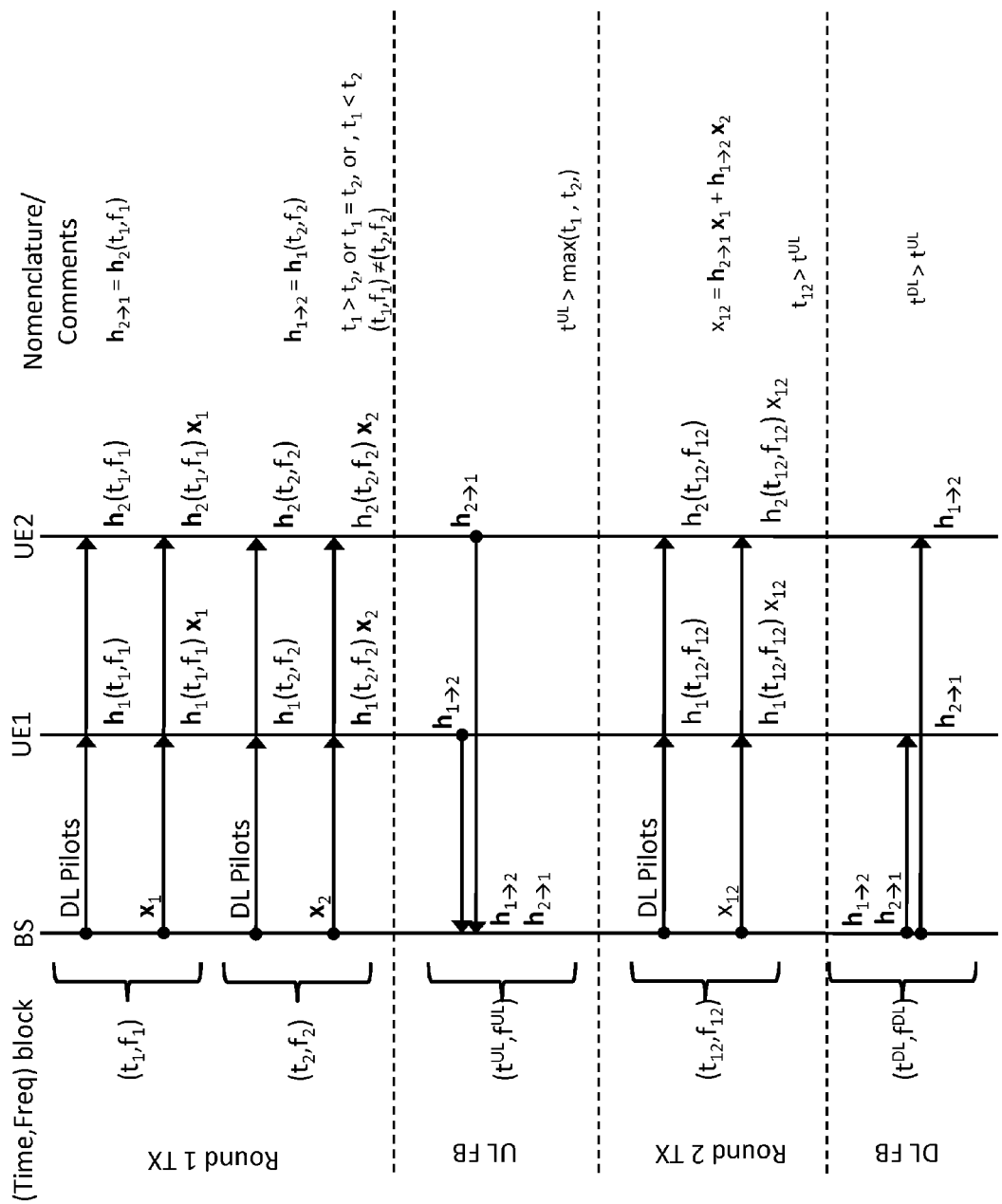
FIG. 3 is a timing diagram of a two-UE MAT session.

FIG. 3 is a timing diagram associated with the signaling required to enable a MAT session between two users, based on outdated CSI. Assuming $N_r \geq (2N_t)$. This scheme can enable sending $2N_t$ symbols to each UE over 3 time-frequency data-transmission time-frequency slots, for a total multiplexing gain of $4N_r/3$ per slot. In particular, the scheme communicates to UE k a vector (sequence) $x_k$ of dimensions $2N_r \times 1$ over three slots (or resource blocks). Without loss of generality we consider the case $N_r=1$, in which case $N_r \geq 2$, and $x_k$ is 2-dimensional. As shown in FIG. 3, reference signals (e.g., DL pilots) are transmitted along with the desired transmission signal $x_k$ during time-frequency resource block $(t_k, f_k)$, for each k=1, 2. Note that, for each k=1, 2, the reference signals transmitted during time-frequency resource block $(t_k, f_k)$ allow both the intended receiver (UE k) and the eavesdropper (UE j=3−k) to estimate their channels. As shown in FIG. 3, the eavesdropper channel in this cycle is represented via $h_{j \to k}$ signifying that this is the channel of (eavesdropper) j during the transmission of a message for user k.

To enable this 2-user MAT scheme, the user terminal channel needs to be made available to the base station (CSIT) so as to enable the second-round transmission, which occurs during time-frequency resource block $(t_{12}, f_{12})$. This is accomplished via the uplink (UL) feedback (FB) cycle, which takes place during $(t^{UL}, f^{UL})$ time-frequency resource blocks. Each of the eavesdropper channels, $h_{j \to k}$, also needs to be made available to UE receiver k (CSIR), in order to enable coherent decoding UE k. This is accomplished by use of a downlink (DL) FB cycle, which takes place during $(t^{DL}, f^{DL})$ time-frequency resource blocks. The protocols for the UL and DL transmissions within the $(t^{UL}, f^{UL})$ and the $(t^{DL}, f^{DL})$ time-frequency resource blocks are subjects of embodiments of inventions described herein.

Figure 4:
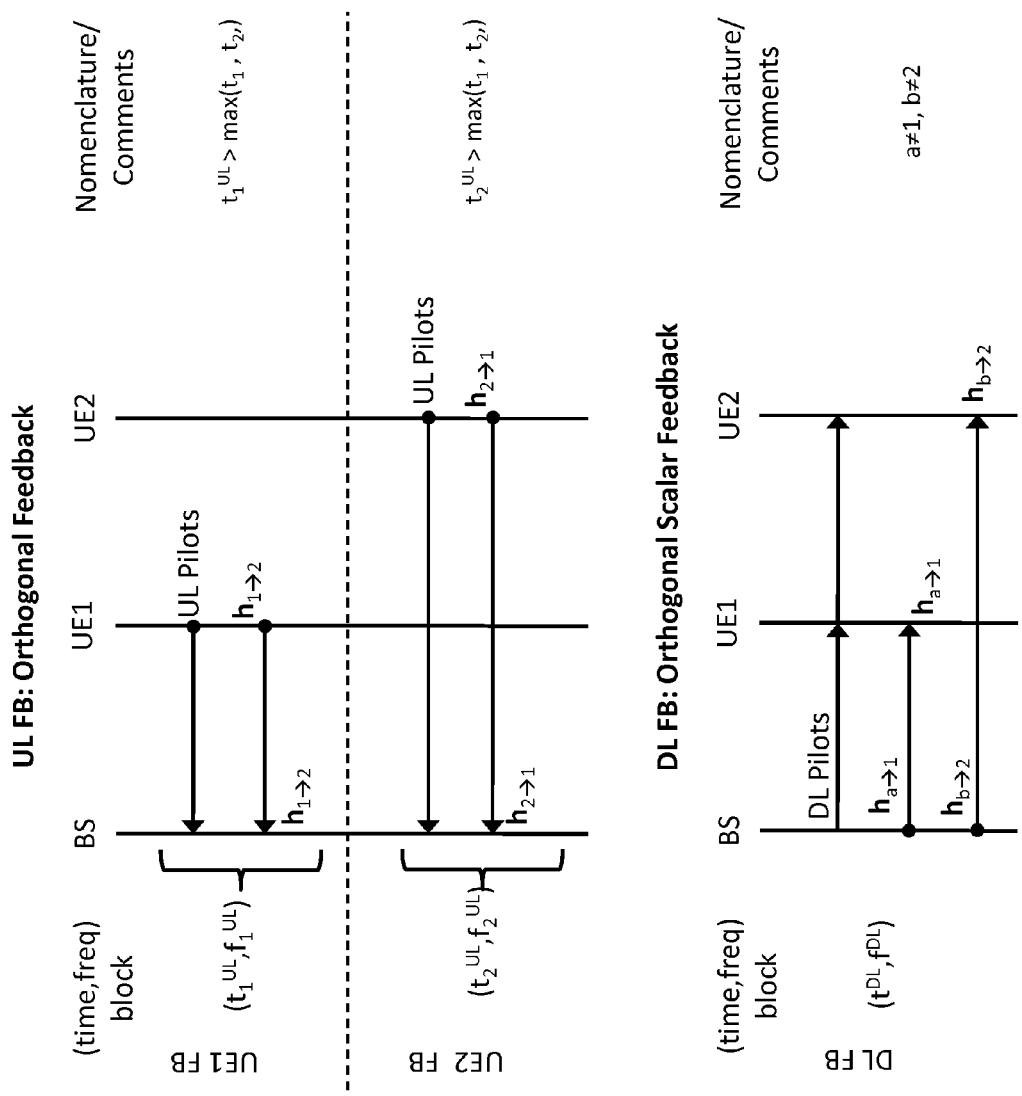
FIG. 4 is a timing diagram illustrating CSIT/CSIR dissemination by use of orthogonal feedback in the uplink (UL) and downlink (DL) respectively.

FIG. 4 a timing diagram illustrating CSIT and CSIR dissemination by orthogonal scalar signaling in the UL and DL, respectively. This serves as a reference design for CSI dissemination. As shown in FIG. 4, in the reference design, distinct UL time-frequency resources are allocated to each UE for training (e.g., for sending UL pilots from each UE in order to allow the base station to estimate the channel from each UE to the base station) and for transmission of their eavesdropper channel coefficients to the base station. Similarly, the base station also uses distinct time-frequency resources for delivering the eavesdropper CSI to each intended receiver. In the example shown in FIG. 4, the base station transmits DL pilots during time-frequency block $(t^{DL}, f^{DL})$ from a single antenna. This allows each UE to estimate the channel between the pilot-transmitting antenna and the UE antenna. The base station also broadcasts (from the pilot-transmitting antenna) scalar channel coefficients intended for UE1 and UE2 respectively on non-overlapping subsets of resource elements (within the same time-frequency block). Embodiments of the invention include techniques that have higher CSI dissemination efficiency (in terms of the UL/DL resources utilized) than the reference design shown in FIG. 4

Figure 5:
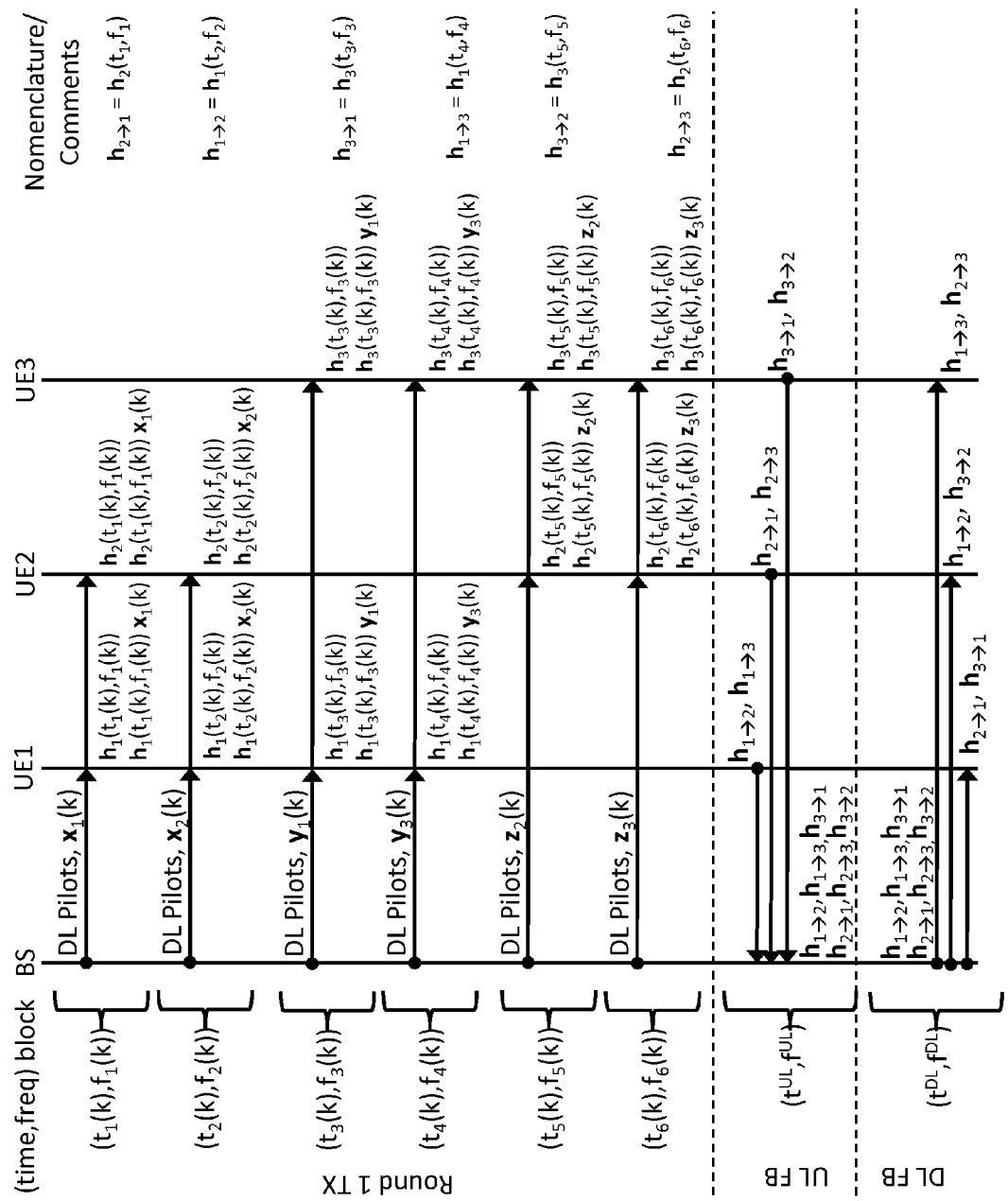
FIG. 5 is a timing diagram illustrating three UEs involved in two-user MAT sessions.

First, note that, although FIG. 3 shows a two-user MAT session between two UEs, i.e., UE 1 and UE 2, in general each UE may be engaged in MAT sessions with several users. This for instance would be the case involving scheduling. One such example is shown in FIG. 5. The base station employs a MAT session between UE 1 and UE 2 and involves sending $x_1(k)$ to UE1 and $x_2(k)$ to UE2. As shown in FIG. 5, reference signals (DL pilots) are transmitted along with the desired transmission signal $x_j(k)$ during time-frequency resource block $(t_j(k), f_j(k))$, for each j=1, 2. Note that, for each j=1, 2, the reference signals transmitted during time-frequency resource block $(t_j(k), f_j(k))$ allow both the intended receiver (UE j) and the eavesdropper (UE j'=3−j) to estimate their channels.

Also as shown in FIG. 5, another MAT session is employed by the base station in between UE 1 and UE 3 and involves sending $y_1(k)$ to UE 1 and $y_3(k)$ to UE3. Reference signals (DL pilots) are transmitted along with the desired transmission signal $y_j(k)$ for j=1 and j=3, during time-frequency resource block $(t_3(k), f_3(k))$, and $(t_4(k), f_4(k))$, respectively. Note that, for each j=3, 4, the reference signals transmitted during time-frequency resource block $(t_j(k), f_j(k))$ allow both UE 1 and UE 3 estimate their channels.

Furthermore, as shown in FIG. 5, there is also a third two-user MAT session employed by the base station and involves sending $z_2(k)$ to UE 2 and $z_3(k)$ to UE 3. Reference signals (DL pilots) are transmitted along with the desired transmission signal $z_j(k)$ for j=2 and j=3, during time-frequency resource block $(t_5(k), f_5(k))$, and $(t_6(k), f_6(k))$, respectively. Note that, for each j=5, 6, the reference signals transmitted during time-frequency resource block $(t_j(k), f_j(k))$ allow both the UE 2 and UE 3 to estimate their channels.

Also shown in FIG. 5 (in the right column) is the eavesdropper channel in each time-frequency block $(t_j(k), f_j(k))$, whereby $h_{m \to n}$ signifies that this is the channel of (eavesdropper) m during the transmission of a message for user n. As FIG. 5 illustrates, resources can be aggregated in both the UL and the DL for efficient CSIT (UL) and CSIR (DL) dissemination. Specifically, FIG. 5 shows an UL FB cycle, which takes place during $(t^{UL}, f^{UL})$ time-frequency resource blocks. Each of the eavesdropper channels, $h_{j \to k}$, also needs to be made available to UE receiver k (CSIR) in order to enable coherent decoding UE k. This is accomplished by use of a DL FB cycle, which takes place during $(t^{DL}, f^{DL})$ time-frequency resource blocks.

CSIT Dissemination Via UL Transmissions

In one embodiment, CSIT dissemination occurs via uplink transmissions. Such information is used for transmitting information in a multi-user (MU)-MIMO wireless communication system having a multi-antenna transmitter and a plurality of user terminals. In one embodiment, a method for disseminating CSIT via uplink transmissions includes sending a pilot to a base station from each of at least two user terminals as part of round-1 MAT transmissions to train antennas at the base station, eavesdropping, by those user terminals, the round-1 transmissions, and then simultaneously transmitting to the base station, in a same time-frequency block, from the those user terminals channel state information corresponding to eavesdropped round-1 transmissions that each of the at least two user terminals has eavesdropped to enable a MAT session between the at least two user terminals. By doing so, the CSIT information is disseminated so that round-2 transmission of the MAT session can be performed.

Figure 6:
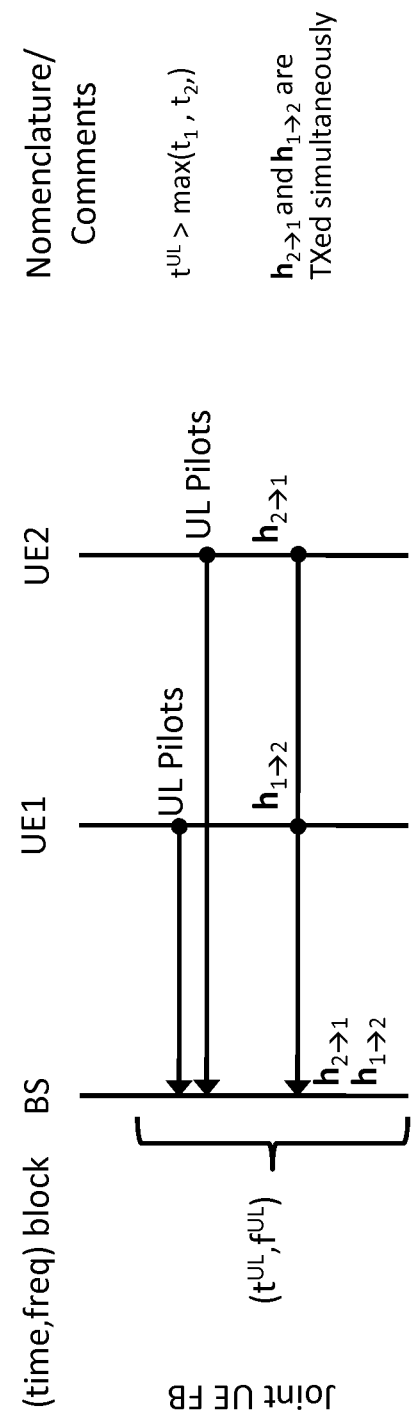
FIG. 6 is a timing diagram illustrating CSIT dissemination for a common MAT session by MU-MIMO data transmission in the UL.

FIG. 6 is a timing diagram illustrating a method for efficient dissemination of the CSIT needed at the base station in order to enable the (round-2 transmissions of the) MAT sessions in FIG. 3 (and FIG. 5). In one embodiment, within a single time-frequency block, UL pilots are sent orthogonally by two UEs (either on different resources, or by use of an orthogonal code across two or more resources) to train the $N_R \geq 2$ antennas at the base station. In the same time-frequency block, the two UEs transmit simultaneously (over each data-transmission time-frequency element) channel coefficients on round-1 messages that each UE has eavesdropped, and which are required at the base station to enable round-2 transmission. Thus, in one embodiment shown in FIG. 6, users 1 and 2 transmit simultaneously channels that are needed to enable a MAT session between the two users.

Figure 7:
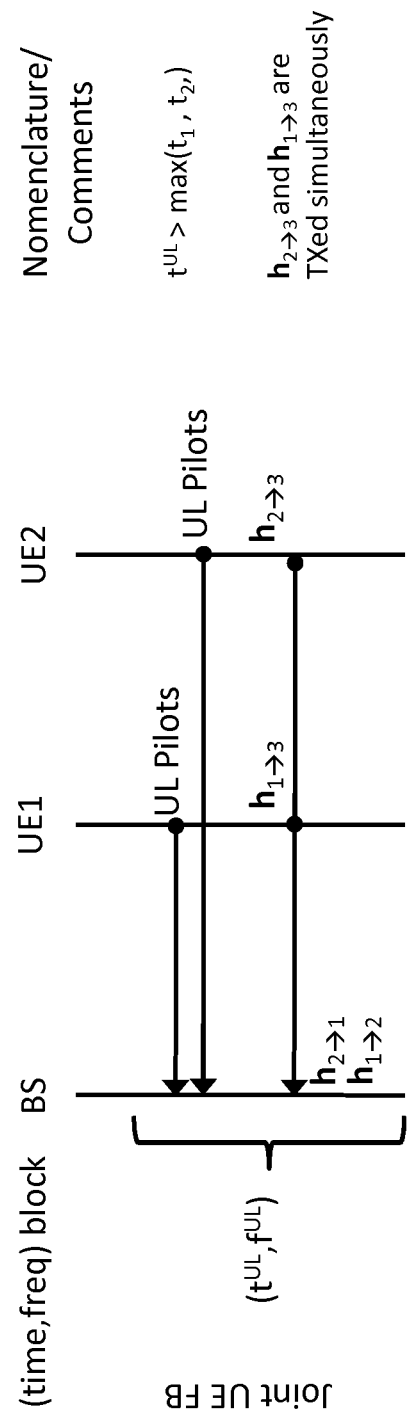
FIG. 7 is a timing diagram illustrating CSIT dissemination of CSI pertaining to a common intended receiver by MU-MIMO data transmission in the UL.

In one embodiment, at least one of the coefficients transmitted involves enabling a MAT session between the transmitting UE and a different UE. One such example is shown in FIG. 7 and involves UE 1 and UE 2 simultaneously transmitting eavesdropped channels $h_{1\rightarrow 3}$ and $h_{2\rightarrow 3}$, respectively, both pertaining to a common intended receiver, in this case, UE 3. This embodiment is advantageous in the case where UE 3 can also eavesdrop in the UL, as it would also obtain a single linear combination of two coefficients that it would also need to acquire (CSIR) for coherent decoding. Hence only one of these two coefficients would need to be disseminated in the DL to UE 3, because the remaining one would be decipherable from the UE 3's UL observation of the corresponding UL session shown in FIG. 7.

CSIR Dissemination Via UL and DL Transmissions

In one embodiment, CSIR dissemination occurs via uplink and downlink transmissions. Such information is used for transmitting information in a multi-user (MU)-MIMO wireless communication system having a multi-antenna transmitter and a plurality of user terminals. In one embodiment, a method for disseminating the CSIR information via uplink and downlink transmissions includes obtaining, by a first user terminal observing the uplink channel, a linear combination of eavesdropped messages transmitted by multiple user terminals to the base station, where the user terminals do not include the first user terminal; the first user terminal estimating the channel between those user terminals and itself using the linear combination; and generating, by the first user terminal, channel coefficients for use in communicating with the base station.

Figure 8:
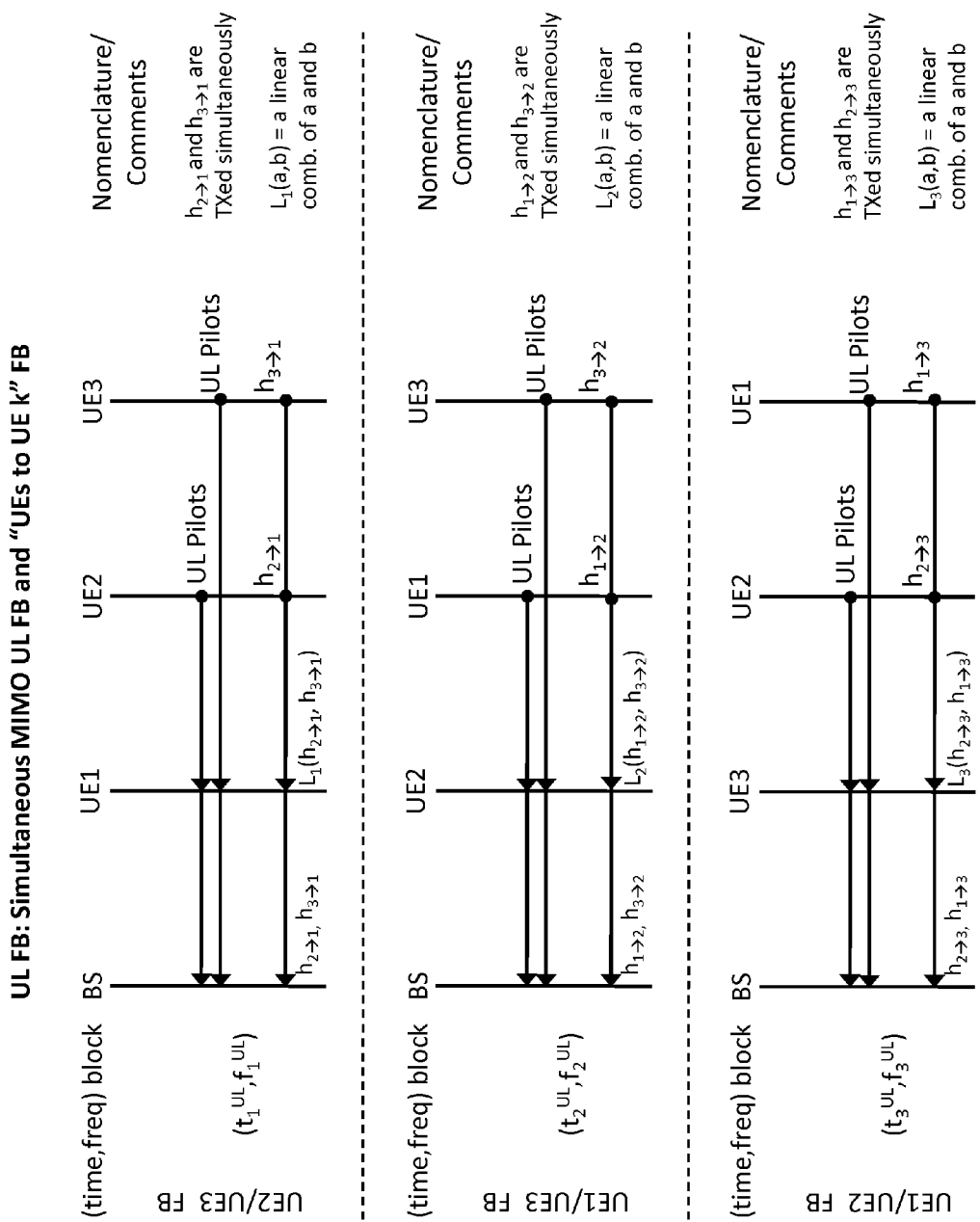
FIG. 8 is a timing diagram illustrating CSIT UL feedback with UE to UE feedback (FB).

FIG. 8 is a timing diagram illustrating a method, associated with the timing diagram of FIG. 5 that relies on UL feedback dedicated to a single UE as in the embodiment in FIG. 7 in accordance with one embodiment. In this case, FIG. 8 explicitly shows the intended UE in each case "listening in" on the uplink channel and obtaining a linear combination of the eavesdropped messages transmitted by the other two UEs to the base station.

Referring to FIG. 8, during time-frequency block ($t_1^{UL}$, $f_1^{UL}$), UE 2 and UE 3 transmit orthogonal UL pilots. These UL pilots allow the base station to estimate the channel between the pilot-transmitting UEs and the base station. These UL pilots also allow UE 1 to estimate the channel between the pilot-transmitting UEs and UE 1. UE j for j=2, 3 also transmit, during time-frequency block ($t_1^{UL}$, $f_1^{UL}$), channel coefficient pertaining to channels UE j has experienced during the transmission of messages intended for UE 1. In the embodiment illustrated in FIG. 8, UE2 and UE3 transmit coefficients simultaneously. Note that, since the base station has at least 2 antennas, on each resource element, the base station has two observations (noisy linear combinations) of the two coefficients that were transmitted by UE 2 and UE 3 on that element. As a result, the base station can recover (i.e., estimate) the two coefficients. On the other hand, UE 3 may only have one antenna. In that case, UE 3 obtains a single (noisy) linear combination of the two transmitted coefficients. Although this single combination does not suffice in decoding the two coefficients, in one embodiment, the coefficients of the linear combination and the value of the linear combination (on each resource element) are all stored by UE 3 for later use. Indeed a single extra equation is only needed by UE 3 to resolve both of these coefficients. For instance, making available only one of these two transmitted coefficients by use of other transmission options to UE 3, also makes available the other (missing) coefficient. This can easily be accomplished at UE 3 by exploiting the stored linear combination and the known coefficient. As FIG. 8 illustrates, the process is repeated with UE j for =2, 3 listening in on channel coefficients sent by the other two UEs during time-frequency block ($t_j^{UL}$, $f_j^{UL}$). These correspond to coefficients on channels experienced by the other two UEs during the transmission of messages intended for user j.

Figure 9:
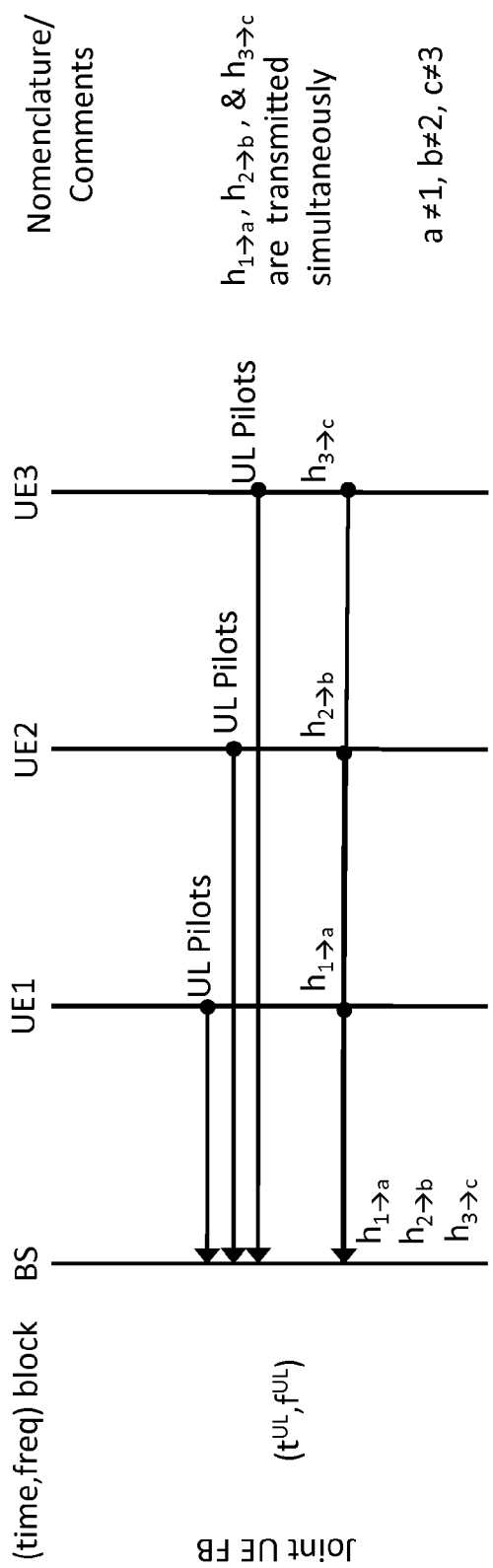
FIG. 9 is a timing diagram illustrating CSIT FB via UL MU-MIMO serving more users in the UL MU-MIMO than the corresponding MAT session.

FIG. 9 is a timing diagram illustrating a method in which two-user MAT sessions are enabled to single-antenna users by a base station with $N_t > 2$ in accordance with one embodiment. Referring to FIG. 9, the UL feedback channel can be used to provide CSIT simultaneously from 3 or more (up to $N_t$) UEs at the same time. As illustrated, during time-frequency block ($t^{UL}$, $f^{UL}$), UE 1, UE 2, and UE 3 transmit orthogonal UL pilots. These UL pilots enable the base station to estimate the channel between each UE and the $N_t$ base station antennas. The three UEs also provide CSIT feedback simultaneously to the base station, by simultaneously transmitting channel coefficients on a subset of resource elements of time-frequency block ($t^{UL}$, $f^{UL}$), where each channel coefficient transmitted by UE j pertains to the coefficient of a channel experienced by UE j during the transmission of message intended for some other user (or users). In one embodiment, the intended receiver is from the same set, i.e., a =2 or 3, b=1 or 3, and c=1 or 2. In one embodiment, a=b=c and these are different from 1, 2, and 3.

CSIR Dissemination Via DL Transmissions

In one embodiment, CSIR dissemination occurs via downlink transmissions. Such information is used for transmitting information in a multi-user (MU)-MIMO wireless communication system having a multi-antenna transmitter and a plurality of user terminals. In one embodiment, a method for disseminating the CSIR information via downlink transmissions includes receiving, by each of at least two user terminals, observations of a pilot transmitted by the base station to antennas of the two user terminals; estimating, by each of the those terminals, a channel between a pilot-transmitting antenna of a base station and their antenna based on the observations of the pilot transmitted by the pilot-transmitting antenna; observing a broadcast of a first linear combination of at least two channel coefficients made by the base station based on observations made by the base station, where the first linear combination includes estimates of CSI channel coefficients; and at least one of those user terminals obtaining an estimate of channel coefficients based on the observed first linear combination and based on a combination of its estimation of the channel between the pilot-transmitting antenna and its antenna based on the observation the at least one user terminal received.

Figure 10:
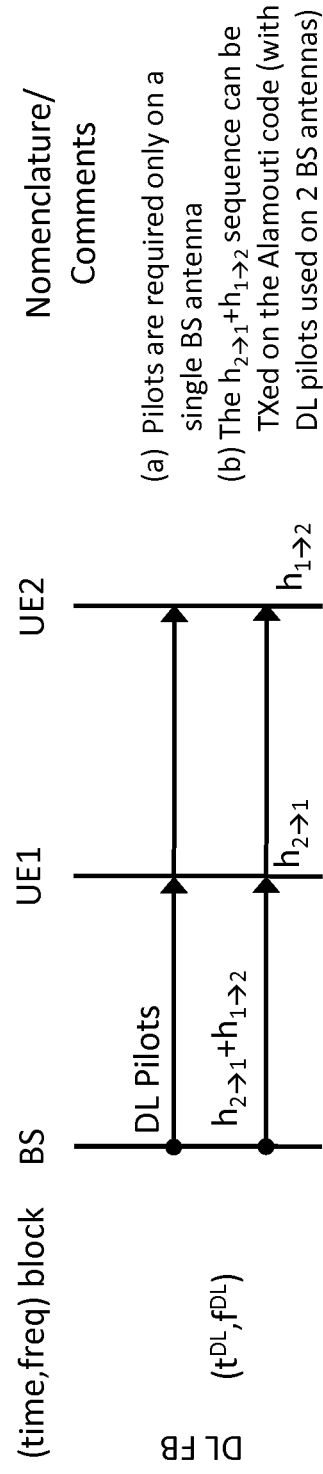
FIG. 10 is a timing diagram illustrating a way to disseminate CSIR in the DL.

FIG. 10 is a timing diagram illustrating a method in which CSIR is disseminated in the DL in accordance with one embodiment. This is more efficient than the embodiment presented in FIG. 4. The embodiment in FIG. 10 transmits scalar coefficients in the DL in a similar manner to the manner in which data is transmitted in the second round of the reference data-transmission scheme shown in FIG. 3.

Referring to FIG. 10, the base station transmits DL pilots during time-frequency block ($t^{DL}$, $f^{DL}$) from a single antenna. This allows each of the two UEs to estimate their channel between the pilot-transmitting antenna and their UE antenna within time-frequency block ($t^{DL}$, $f^{DL}$). On (at least one) resource-element not allocated for DL pilot transmission within time-frequency block ($t^{DL}$, $f^{DL}$), the base station broadcasts (from the same antenna from which the pilot was transmitted within the time-frequency block) the sum of two scalar channel coefficients, $h_{1\rightarrow 2}$ and $h_{2\rightarrow 1}$. As shown in FIG. 10, UE 1 uses its estimate of the channel within time-frequency block ($t^{DL}$, $f^{DL}$), obtained based on the single-pilot transmission, together with the single observation of the transmission of the sum of the two channel coefficients, $h_{1\to2}$ and $h_{2\to1}$, to recover (estimate) the sum of $h_{1\to2}$ and $h_{2\to1}$. Then, UE1 exploits its knowledge of $h_{1\to2}$ to obtain (estimate) $h_{2\to1}$. In one embodiment, UE 1 estimates $h_{2\to1}$ by subtracting from the sum estimate the value of $h_{1\to2}$. Similarly, UE 2 recovers (estimates) from the single observation received on its antenna-element the sum of the two channel coefficients. Then, UE 2 exploits its knowledge of $h_{2\to1}$ to obtain (estimate) $h_{1\to2}$. In one embodiment, UE 2 estimates $h_{1\to2}$ by subtracting from the sum estimate the value of $h_{2\to1}$. Hence, the two user terminals can obtain simultaneously one CSI coefficient they need based on the CSI coefficient they have and the received linear combination, yielding an efficiency improvement of a factor of 2 with respect to the original CSIR dissemination scheme in FIG. 4. The simultaneous DL dissemination of CSIR shown in FIG. 10 is exactly the same operation used in the last (second) data-transmission round of the two-user MAT scheme (see FIG. 3 and FIG. 5).

The scalar DL dissemination method shown in FIG. 10 can be used to disseminate CSI for MAT schemes using more than two rounds. For example, to enable a (r+1)-round transmission, eavesdropper CSI is required from round-r transmissions. The CSI associated with the channel of the eavesdropper at the time a round-r message is transmitted is simultaneously needed by the r UEs that are the intended recipients of the round-r message.

Figure 11:
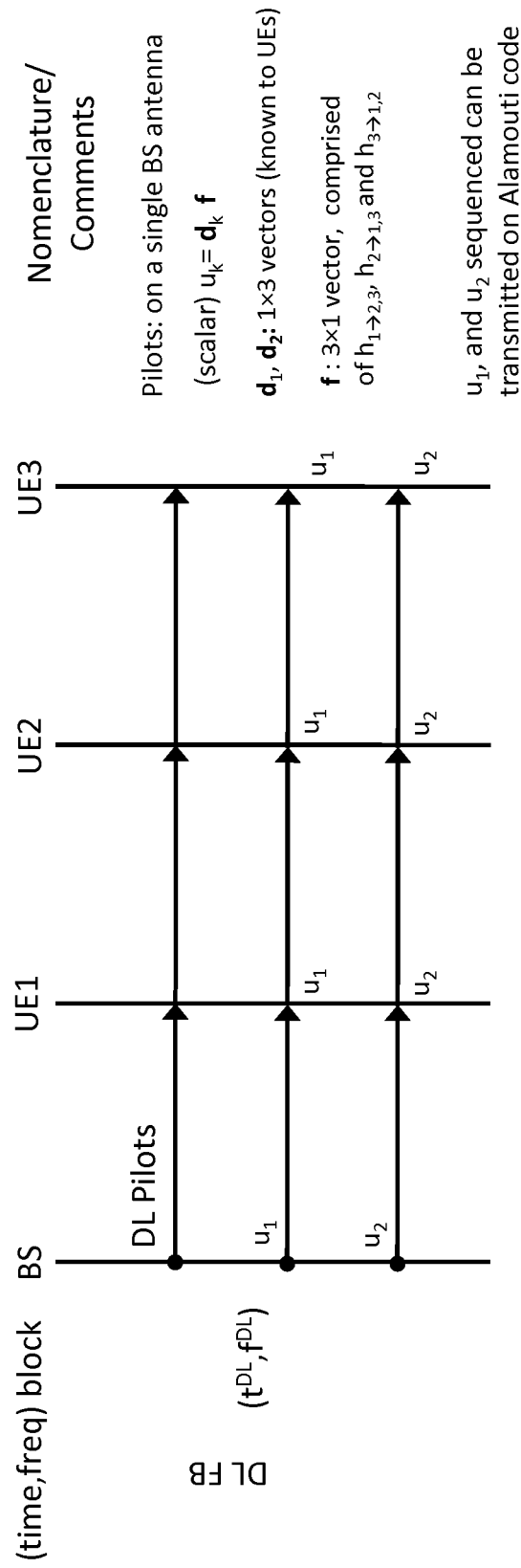
FIG. 11 is a timing diagram illustrating CSIR dissemination of round-2 eavesdropper CSI based on scalar DL transmissions.

FIG. 11 is a timing diagram illustrating an example with r=2, involving 3 UEs, each having eavesdropped a round-2 message intended for the other two. FIG. 11 shows how each of three eavesdropper-CSI channels can be made available to the pair of intended receivers by use of efficient scalar FB. Note that prior to the DL transmission, each UE has one of the coefficients and needs the other two. In the embodiment highlighted in FIG. 11, during time-frequency block ($t^{DL}$, $f^{DL}$), the base station transmits DL pilots from a single antenna element. These pilots enable each of the 3 UEs to estimate their channels to the pilot-transmitting antenna. On a subset of resource elements during time-frequency block ($t^{DL}$, $f^{DL}$), the base station also transmits (from the pilot-transmitting antenna element) two specific scalar linear combinations of the three channel coefficients. The values of the two linear combinations are depicted in the FIG. 11 as $u_1$, and $u_2$. The multipliers of each channel coefficient transmitted in each of the two linear combinations are made known a priori to each of the UEs. Each UE first recovers $u_1$, and $u_2$ and then removes from each value the component that is due to the channel coefficient it knows. Thus, the UE has two linear equations of the two unknown channel coefficients. These two equations enable the UE to estimate the two unknown channel coefficients (provided the coefficients in the two linear combinations of the three channel coefficients are a priori properly chosen).

Figure 12:
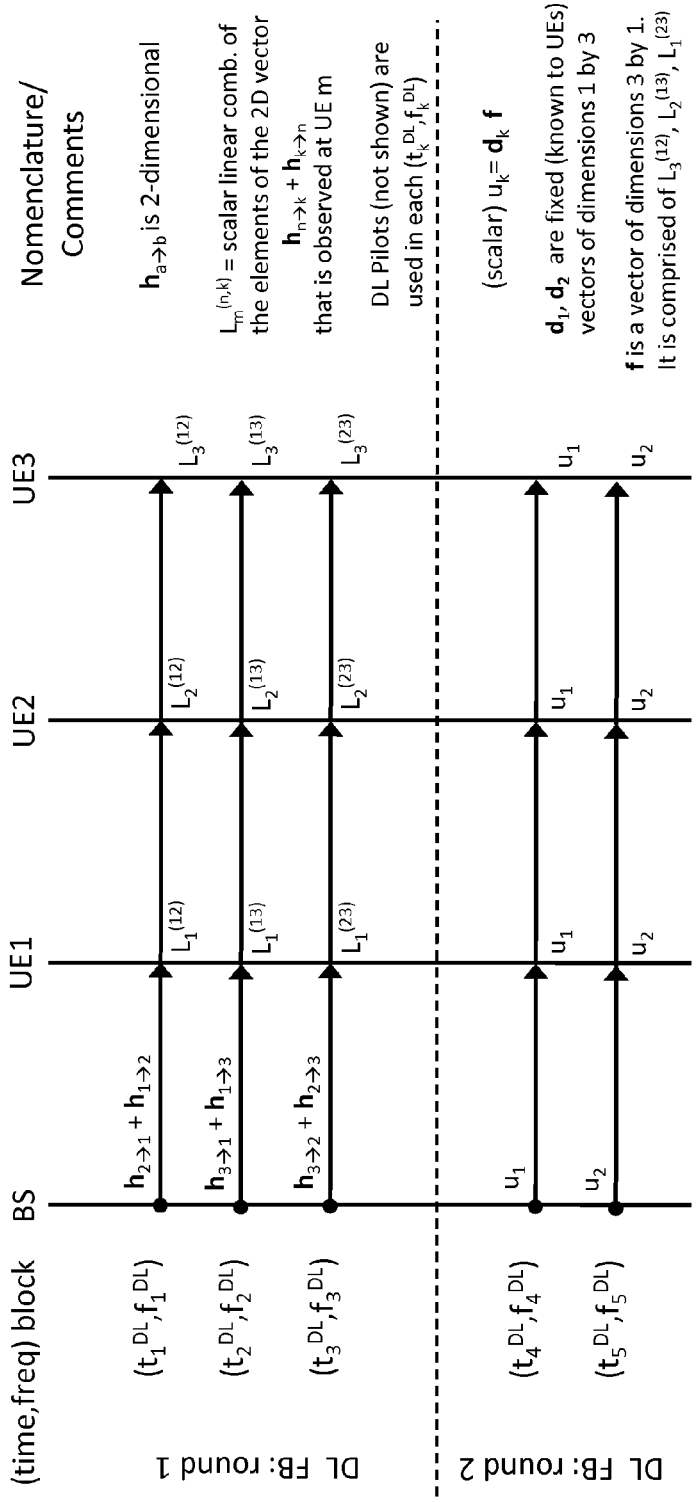
FIG. 12 is a timing diagram illustrating round-1 eavesdropper CSIR via DL MU-MIMO based on outdated CSI.

FIG. 12 is a timing diagram that illustrates a method for disseminating for round-1 eavesdropper CSIR in accordance with one embodiment. Referring to FIG. 12, the method exploits DL MU-MIMO transmission based on outdated CSI in order to disseminate round-1 CSI needed for two-user MAT schemes between pairs of UEs. In this embodiment, the base station needs to have available at least 2 antenna elements to be able to support two-user MAT sessions. To disseminate round-1 CSIR, the method relies on mapping the CSIR dissemination problem into an intermediate stage of a "fictitious" 3-user MAT scheme, in which the eavesdropper CSIR that needs to be disseminated is "identified" as the eavesdropper measurements after round 1 of a 3-user MAT scheme.

In one embodiment, the protocol depicted in the timing diagram in FIG. 12 uses two rounds of transmission. The first round includes three transmission blocks, where the base station transmits "pair-wise" sums of two 2-dimensional eavesdropper channels in each block. This operation requires 2 antennas at the BS (although not shown in FIG. 12, DL pilots are transmitted by the two antennas at the BS during each time-frequency block, which allow each UE to estimate the channel between the two BS antennas and the UE). The second round contains two scalar transmissions (and DL pilots from the single transmitting base station antenna).

Note that to enable the second round of the DL FB, eavesdropper CSIT is needed from the first DL FB round. This can be provided with any of the earlier UL feedback methods in the invention. Given its own 5 scalar measurements, each UE can estimate the two 2-dimensional eavesdropper channels it need. As a result, 5 channel uses can provide 12 scalar channel coefficients in the downlink, for a net efficiency of 12/5 CSIR channel coefficients delivered per channel use. In contrast the best scalar DL FB technique depicted in FIG. 10 (which requires no CSIT feedback), this technique provides two channel coefficients per channel use, while the reference scheme of FIG. 4 provides only one coefficient per channel use.

Scheduling Embodiments

Properly designed scheduling algorithms can provide significant benefits in MU-MIMO schemes based on outdated CSI. The basic idea can be illustrated by use of considering enabling scheduling embodiments for two-user MU-MIMO schemes based on outdated CSI. In this case, for k=1, 2, 3, . . . , R, the base station transmits to UE k a sequence of two-dimensional messages $x_k(1)$, $x_k(2)$, . . . , $x_k(n)$, . . . . During the transmission of the n-th (round-1) message for user k, $x_k(n)$, each user, j, with j=1, 2, 3, . . . , R, estimates its channel, denoted by $h_{j,k}(n)$, and saves the corresponding observation, that is, it saves a noisy version of $h_{j,k}(n)$ $x_k(n)$.

For comparison purposes with respect to the feedback methods set forth herein a baseline scheme is used in which the base station requests from the intended UE and from another L out (of the R−1) eavesdropping UEs to send their CSI via UL feedback. Once the intended receiver channel for packet $x_k(n)$, i.e., $h_{k,k}(n)$, and the L eavesdropper channels, i.e., $\{h_{j,k}(n)\}$ for a subset (of size L) of j indices, become available at the base station, the base station can schedule an eavesdropper of the n-th (round-1) message for user k. This can be accomplished by using techniques known in the art based on knowledge of the CSI of the intended user (i.e., user k) and the CSI of all the L eavesdroppers for which the base station has available eavesdropper CSI.

It is worth comparing the feedback requirements associated with this baseline scheme, which enables MU-MIMO transmission with scheduling benefits, against those of a scheme that enables MU-MIMO transmission without scheduling benefits. The CSIT cost of scheduling, i.e., the CSIT feedback overheads of the baseline design for scheduling call for L+1 times as many coefficients to be fed back (CSIT) to the base station: L eavesdropper channels (as opposed to just one eavesdropper channel in the scheme not relying on scheduling), as well as the channel of the intended receiver, k (which is not required at the base station when scheduling is not employed). The CSIR costs associated with the baseline scheme for scheduling, however, are exactly the same as in the non-scheduling case. This is because, only the channels of the scheduled eavesdroppers need to be made available to each intended receiver, i.e., the same number of eavesdroppers as required by a CSIR dissemination scheme that enables MU-MIMO communication based on outdated CSI without scheduling benefits.

Embodiments of the invention enable scheduling benefits (in the sense of improved MU-MIMO performance by use of scheduling) with reduced CSIT costs (with respect to the reference CSI dissemination scheme enabling scheduling), at an additional cost in CSIR dissemination requirements. In one embodiment, this is accomplished by performing some of the scheduling decisions at each of the UEs. In one embodiment, first the intended-user channels, $h_{k,k}(n)$, are made available to the base station by use of UL feedback. This feedback phase can be enabled by the same techniques used in non-scheduling scenarios, to feed back eavesdropper CSI to the base station (via UL transmissions). Subsequently, the base station employs DL transmissions to broadcast these intended-user coefficients back to all UEs.

In one embodiment, for each j, UE j uses knowledge of the intended UE's channel, $h_{k,k}(n)$, and its own channel, $h_{j,k}(n)$, to determine whether or not UE j is a "good" eavesdropper for the n-th message of UE k, for any given n and for UE k, with k≠j. In one embodiment, given at UE j a possibly large set, N, of its own channels during (round-1) transmissions of messages intended for UE k with k≠j, that is, given $\{h_{j,k}(n)\}_{1\le n \le N}$, UE j selects a fraction α≤1 of "sufficiently good" channels out of this set and schedules them for uplink transmissions in order to provide feedback to the base station on the selected channels.

Methods for scheduling the "best" αN eavesdropped channels of user j on the channels that packets were transmitted for user k can be readily derived. In one embodiment, the eavesdropper channels $\{h_{j,k}(n)\}_{1\le n\le N}$ are ordered via a quality metric which is indicative of incremental mutual information. For examples of quality metrics that can be used, see equations 29 and 30, and their supporting text in Ansuman Adhikary, et al., "Multiuser MIMO with Outdated CSI: Training, Feedback and Scheduling," in Proc. of the 49<sup>th</sup> Allerton Conference, September 2011. In one embodiment, the quality metric associated with the n-th message for user k involves using the intended receiver channel, $h_{k,k}(n)$, and the locally available eavesdropper channel $h_{j,k}(n)$, to estimate the mutual information increase that would be provided to the intended receiver, k, if the eavesdropper observation of user j on the n-th message for user k were made available to receiver k. In one embodiment, the eavesdropper scheduling techniques presented in PCT Patent Application No. PCT/US2012/049612, titled "A METHOD AND APPARATUS FOR SCHEDULING AND MU-MIMO TRANSMISSION BASED ON OUTDATED CHANNEL STATE INFORMATION AT THE TRANSMITTER", filed Aug. 3, 2012, for use at the base station to determine eavesdropper channel quality (and used for packet-centric scheduling), can be exploited at the UE side, i.e., at UE j for choosing the αN channels on which UE j is to provide CSIT feedback.

The UE-based selective-eavesdropper CSI feedback embodiments described herein provide reductions in the CSIT overheads with respect to the reference scheme, at the cost of additional CSIR feedback (the intended-user CSI needs to first be broadcasted by the base station to each eavesdropper to enable user-terminal based eavesdropper channel selection for UL CSI feedback), potentially extra delays (e.g., for intended-user CSIT broadcasting, scheduling delays). Embodiments of the invention described herein provide similar or even better performance than the reference scheduling-scheme using L eavesdroppers per channel, and which have lower CSIT cost than the baseline eavesdropper CSI dissemination scheme that enables scheduling benefits.

In one embodiment, intended-receiver CSIT (available at the base station via UL feedback) is first made available to all users by broadcasting (in the downlink) the channel of each intended receiver, during the transmission of a set of N messages for each user, for a set of R UEs (with R>L). In one embodiment, each UE, j, in the set of R UEs selects a fraction $\alpha_{j,k}\le 1$ of sufficiently good eavesdropped channels of messages intended for user k, and schedules them for UL CSIT feedback, along with the corresponding round-1 message-identifying indices (signifying the user and packet index associated with the channel coefficient fed back). In one embodiment, the $\alpha_{j,k}$'s are predetermined and fixed. In one embodiment, the set of $\{\alpha_{j,k}\}_{k\ne j}$ are locally determined at each node j. In one embodiment, the user terminal selects the best α(R−1)N channels that it experienced over all the messages for all the users over which the user is an eavesdropper. In that case, the $\alpha_{j,k}$ value equals one over N times the number of the α(R−1)N selected eavesdropper channels selected by user j, which correspond to UE j channels during the transmission of messages by the base station that were intended for user k. Examples of choosing values for α are described in the context of specific embodiments that follow. In the embodiment described above, each user selects the intended-user messages for which to send back eavesdropper CSIT independently of the eavesdropper-CSIT selection processes performed by other UEs. In general, the number of eavesdropper channels available to the base station regarding the n-th packet of user k varies in such embodiments with n and k, and it is equal to the number of eavesdropper UEs that (independently of one another) chose to and fed back CSI on the round-1 transmission of the given message. Let $\xi_k[n]$ denote the number of eavesdropper channels available for the n-th channel of the k-th user. Note that $$\bar{\xi}_k = \frac{1}{N}\sum_{n=1}^{N} \xi_k[n] = \sum_{1\le j\le L; j\ne k} \alpha_{j,k}$$

denotes the average number of eavesdroppers available to the base station regarding each message for user k.

Clearly, $\xi_k[n]$ can be as small as 0, corresponding to the case that no eavesdropping UE fed back the channel it had experienced during the transmission of the n-th message to user k, and as large as R−1, corresponding to the case that all eavesdroppers fed back their channels from the transmission of the n-th message to user k. Having $\xi_k[n]\ge 1$ allows the base station to schedule an eavesdropper for the n-th message of user k. When $\xi_k[n]>1$, the scheduling schemes in PCT Patent Application No. PCT/US2012/049612, titled "A METHOD AND APPARATUS FOR SCHEDULING AND MU-MIMO TRANSMISSION BASED ON OUTDATED CHANNEL STATE INFORMATION AT THE TRANSMITTER", filed Aug. 3, 2012, can be used to select the "best" eavesdropper for packet $x_k[n]$ out of the total of $\xi_k[n]$ eavesdroppers.

When $\xi_k[n]=1$, in one embodiment, the base station schedules the single eavesdropper that fed back its channel. Note, however, that scheduling (performance) benefits have already been harvested at the UE that fed back their eavesdropper channel as this channel was of sufficiently high quality to be fed back. For sufficiently large R, the scheduling performance gains provided by this selective feedback scheme can outperform those corresponding to a reference scheduling scheme relying on feedback by a fixed size set of L eavesdroppers for scheduling an eavesdropper.

When, however, $\xi_k[n]=0$, the base station has no eavesdropper channels to consider for scheduling an eavesdropper for the n-th message of user k. Thus, additional feedback cycles are required in order to enable round-2 transmission (with or without scheduling benefits) involving the n-th message of user k, for all values of n and k for which $\xi_k[n]=0$.

In one embodiment, the baseline scheme is applied (for enabling scheduling benefits) on all messages for which $\xi_k[n]=0$. In one embodiment, the base station requests feedback from L eavesdroppers (e.g., at random) as for each message n of each user k, for which $\xi_k[n]=0$.

By properly choosing the fraction of the (eavesdropping) channels that each UE feeds back to the base station, efficacy benefits can be enabled by this scheme without compromising its scheduling benefits. To see this assume that each user has intended receiver CSI available for N messages per user. Thus, user j has available eavesdropper CSI that it can potentially send back on (R−1)N messages on which it is the eavesdropper. Assume that each user chooses a fraction cc of these channels to send back. Let $\zeta_{j,k}[n]=1$, if user j schedules and feeds back its channel $h_{j,k}[n]$, and 0 otherwise. The probability that $\zeta_{j,k}[n]=1$ is equal to $\alpha$, as only a fraction $\alpha$ of messages are fed back by user j. Note also that the number of eavesdropper channels of the n-th message of user k that are fed back via the UE-based selective CSI-feedback round satisfies $$\xi_k[n] = \sum_{j \neq k} \zeta_{j,k}[n].$$

The probability that $\xi_k[n]=0$ is thus $(1-\alpha)^{R-1}$. As a result, on average, for $(1-\alpha)^{R-1}NR$ out of the original NR user messages for which eavesdropper channels are needed at the base station, there are no available eavesdroppers at the base station after the completion of the UE-based selective CSI-feedback round. The second round of feedback dissemination in this embodiment corresponds to using the reference eavesdropper CSIT dissemination scheme. Thus, the average number of eavesdropper channels feed back by this scheme over the two rounds (selective and reference rounds) is given by $$f_{CSIT,selective} = \frac{R\alpha(R-1)N + (1-a)^{R-1}NRL}{NR} = \alpha(R-1) + L(1-\alpha)^{R-1}$$

Given a value for R (number of users involved in this selective dissemination scheme), and a value for the size of the eavesdropper set for the baseline scheme, L, the optimal choice of a in terms of minimizing $f_{CSIT, selective}$, is given by $$\alpha^* = 1 - \left(\frac{1}{L}\right)^{\frac{1}{R-2}}$$

which, when substituted for a in the equation defining $f_{CSIT, selective}$ above, yields the minimum value for $f_{CSIT, selective}$ possible with this two-stage feedback dissemination scheme.

It is worthwhile to compare the efficacy of this selective CSI feedback scheme against the baseline scheme for a fixed L. The baseline scheme has a fixed cost of $f_{SCIT, reference}=L$ eavesdropper channels/message. For large R, it can be shown that $f_{CSIT, selective}(\alpha^*)$ approaches $1+\log(L)$, thereby yielding benefits of the order of $L/\log(L)$ in eavesdropper CSIT dissemination overheads with respect to the baseline scheme. As a representative numerical example, consider the case where it is required to design a system with scheduling performance equivalent (or better) to the performance provided by a baseline system that relies on scheduling based on eavesdropper feedback from L=10 users. The CSIT cost for the baseline system is $f_{CSIT, reference}=L=10$ eavesdropper channels/message. Taking as an example the case where R=20, the optimal a value for the selective dissemination scheme becomes $\alpha^* \approx 0.0533$, yielding an average CSIT dissemination cost of value $f_{CSIT, selective} \approx 3.16$, i.e., a 3-fold improvement over the reference method.

In one embodiment, a second round of selective feedback is employed to provide additional CSIT feedback efficacy benefits. In one embodiment, each UE selectively feeds a $\alpha[1]$ fraction of its (eavesdropper) channels. Upon reception of selective CSIT eavesdropper feedback, the base station signals back the indices of the user messages for which $\xi_k[n]=0$. Then, each user applies a second round of selective CSIT feedback and chooses a fraction $\alpha[2]$ of its (eavesdropper) channels on messages for which $\xi_k[n]=0$ after round-one selective feedback. On the remaining messages for which the base station has no channels after the two rounds of selective signaling, in one embodiment, the base station requests and obtains feedback from L eavesdroppers per message, by relying on the baseline scheme. It can be shown that, by optimizing $\alpha[1]$ and $\alpha[2]$ so as to reduce, and potentially minimize, the average overhead, this scheme has overhead that becomes $1+\log(1+\log(L))$ for large R, yielding benefits of the order $L/\log(\log(L))$ over the baseline CSIT dissemination scheme, without compromising scheduling performance.

In one embodiment, a method for disseminating channel state information (CSI) coefficients from a first user terminal, where each CSI coefficient corresponds to the CSI previously observed by the first user terminal during transmission resource blocks used by a base station to communicate information to a second set of one or more user terminals, comprises broadcasting by the base station the channel state information (CSI) of each user terminal in the second set of user terminals, on the subset of transmission resources used by the base station to communicate information to each user terminal in the second set; receiving observations of these transmissions by the first user terminal; performing user terminal based eavesdropper channel selection for uplink CSI feedback to select a subset of the CSI coefficients for uplink transmission; scheduling the subset of the CSI coefficients for uplink transmission; and transmitting the subset of the CSI coefficients via the uplink transmission.

Figure 13:
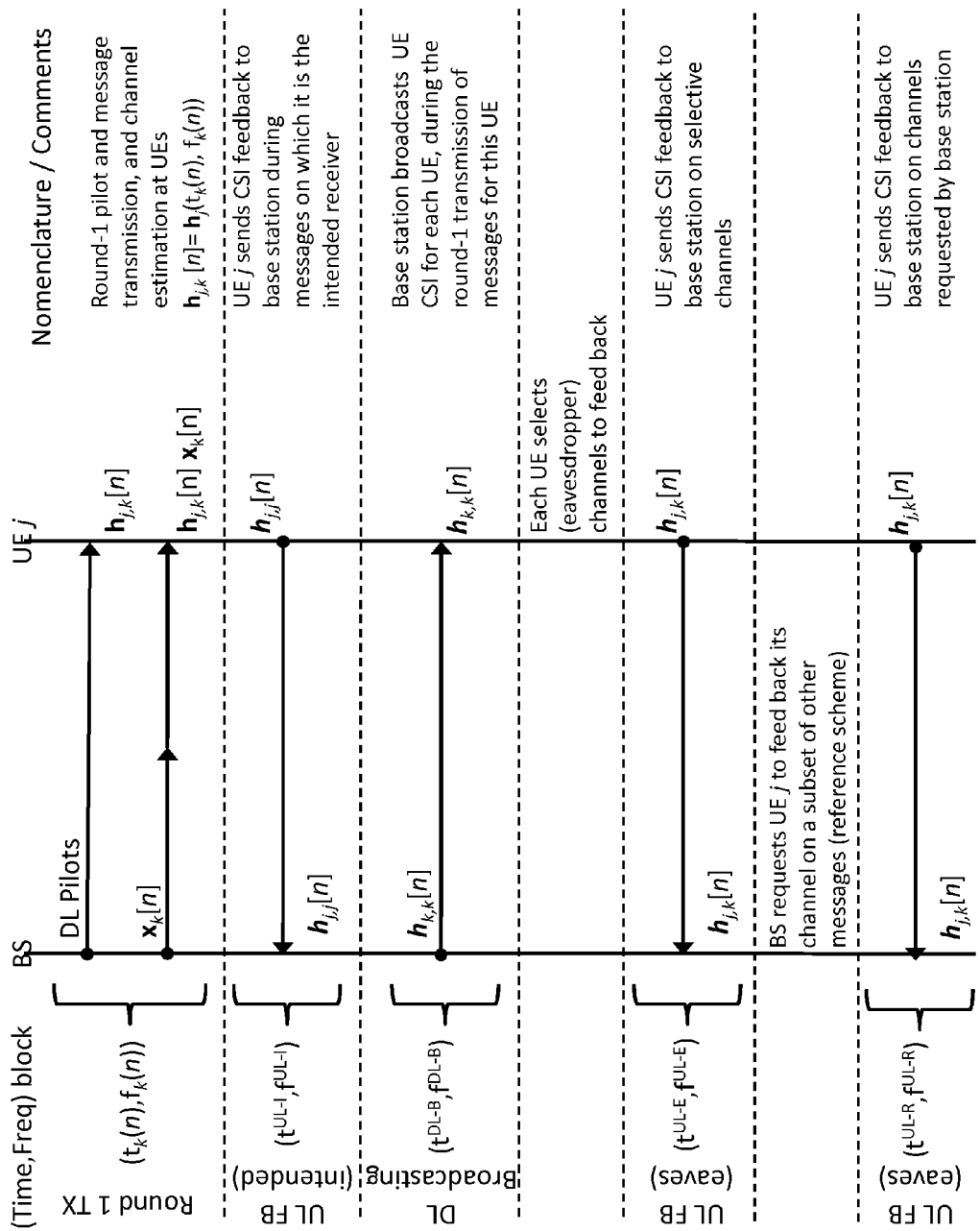
FIG. 13 is a timing diagram illustrating UE-based selective eavesdropper CSIT feedback between a UE and a base station (BS).

FIG. 13 is a timing diagram associated with some embodiments of a UE-based selective eavesdropper CSIT feedback method. Referring to FIG. 13, first, round-1 messages are transmitted by the base station for each user k. In particular, during time-frequency block $(t_k(n), f_k(n))$, the base station transmits a two-dimensional message $x_k(n)$ and (orthogonal) DL pilots from two of its antennas. Then UE j estimates its channel during the transmission of such a message based on the DL pilots, whether or not the message is intended for UE j (j=k) or not (k≠j). Subsequently, during time-frequency block $(t^{UL-I}, f^{UL-I})$, terminal j disseminates (by UL transmissions) its DL channels on DL transmissions of messages intended for user j. This can be done independently via uplink transmissions dedicated to terminal j on in conjunction with uplink transmissions from other terminals. The base station obtains observations of these transmissions and uses them to estimate the intended-user channels in round-1 message transmissions. Then the base station broadcasts these channels back to them, thereby making them available to all UEs. In one embodiment, during time-frequency block ($t^{DL-B}$, $f^{DL-B}$), the base station transmits (DL pilots and) these coefficients one at a time from one of its antennas. Subsequently, UE j recovers (estimates) these intended-user terminal channel coefficients. Then UE j applies its own algorithm to select a subset of its own CSI coefficients (in round-1 transmissions UE j was an eavesdropper) for each intended UE. Finally, UE j feeds back to the base station (independently, or simultaneously with other UEs) the selected channel coefficients by use of UL transmissions during time-frequency block ($t^{UL-R}$, $f^{UL-R}$). Finally, the base station determines the subset of the messages for each UE on which it has no available CSIT and requests a subset of UEs to provide eavesdropper CSIT on each such message.

Figure 14:
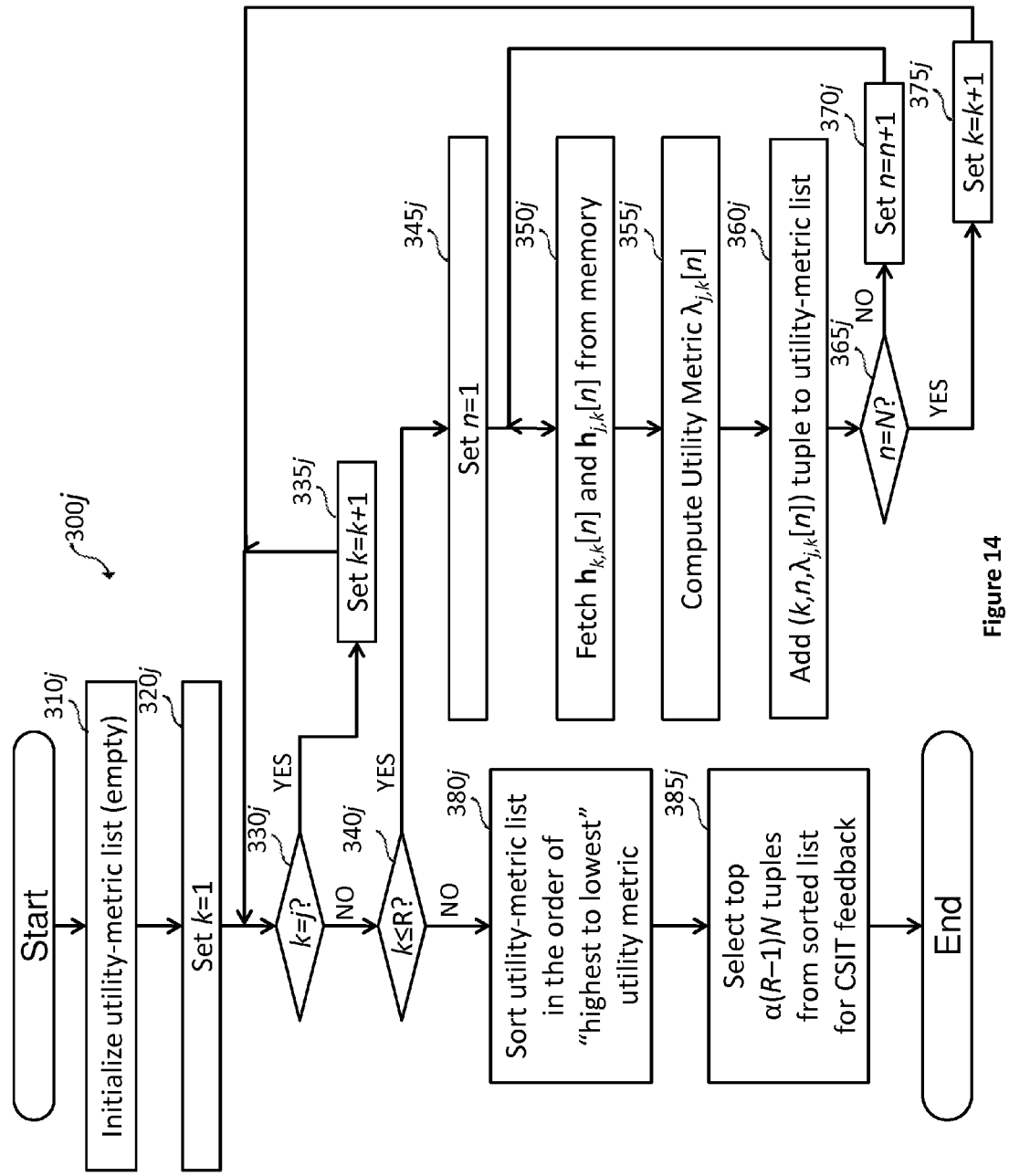
FIG. 14 is a flow diagram of one embodiment of a process for sending UE-based selective eavesdropper CSIT feedback at a UE.

FIG. 14 is a flow diagram of an embodiment of a process for sending UE-based selective eavesdropper CSIT feedback at UE j, where UE j selects the best (according to a utility metric) $\alpha(R-1)N$ channels out of the $(R-1)N$ channels that the UE has experienced during the transmission of $(R-1)N$ messages intended for other users. The process is performed by processing logic that may comprise hardware (circuitry, dedicated logic, etc.), software (such as is run on a general purpose computer system or a dedicated machine), or a combination of both.

In one embodiment, UE j has available its own (eavesdropper) channels $\{\{h_{j,k}[n]\}_{1 \leq n \leq N}\}_{j \neq k}$, obtained (and stored) during the transmission of $(R-1)N$ messages intended for a set of R-1 users $\{\{x_k[n]\}_{1 \leq n \leq N}\}_{j \neq k}$. In addition, UE j also has available the associated intended receiver channels $\{\{h_{k,k}[n]\}_{1 \leq n \leq N}\}_{j \neq k}$. These channels were made available to UE j via a broadcasting phase from the base station during which the set of channels $\{\{h_{k,k}[n]\}_{1 \leq n \leq N}\}_{1 \leq k \leq R}$ were broadcasted in the downlink. As shown in FIG. 14, UE j cycles through each intended UE index k≠j, one at a time, and each packet for that user, one at a time, in order to compute and store a utility metric for each user-message combination.

Referring to FIG. 14, the process begins by processing logic in the UE j initializing its utility-metric list as the empty list (processing block 310j). Then processing logic in UE j sets the intended user index k equal to 1 (processing block 320j) and checks whether k equals j (processing block 330j). In the event that k equals j, processing logic in UE j increments the value of k by 1 (processing block 335j) and returns to perform processing block 330j again. In the event that k does not equal j, processing logic in UE j checks whether or not the maximum value of k has been exceeded (processing block 340j).

If the maximum value of k=R has not been exceeded, processing logic in UE j sets the user-packet index n equal to 1 (processing block 345j). Then processing logic in UE j fetches the intended-UE channel, $h_{k,k}[n]$, and its own (eavesdropper) channel, $h_{j,k}[n]$, from memory (processing block 350j), then uses those channels to compute the associated utility metric (processing block 355j), and then appends the local list of utility metrics (processing block 360j).

After appending the local list of utility metrics, UE j checks to see if the maximum message index value, n=N, has been reached (processing block 365j). If not, the UE increments the value of n by 1 (processing block 370j) and then proceeds in sequence through processing blocks 350j-365j. If instead, in processing block 365j, the maximum message index value, n=N, has been reached, then processing logic in the UE increments the intended-user index value of k by 1 (processing block 375j) and returns to perform processing block 330j again.

Once the UE has cycled through all $(R-1)N$ message-user index pairs, i.e., once the maximum value of k=R has been exceeded (processing block 340j), processing logic in UE j sorts the messages based on their utility metric (processing block 380j), selects the top $\alpha(R-1)N$ message-user index pairs (385j), and terminates its selection process. Then UE j proceeds to schedule its channels during the transmission of the selected $\alpha(R-1)N$ message-user index pairs for CSI feedback via uplink transmission.

Figure 15:
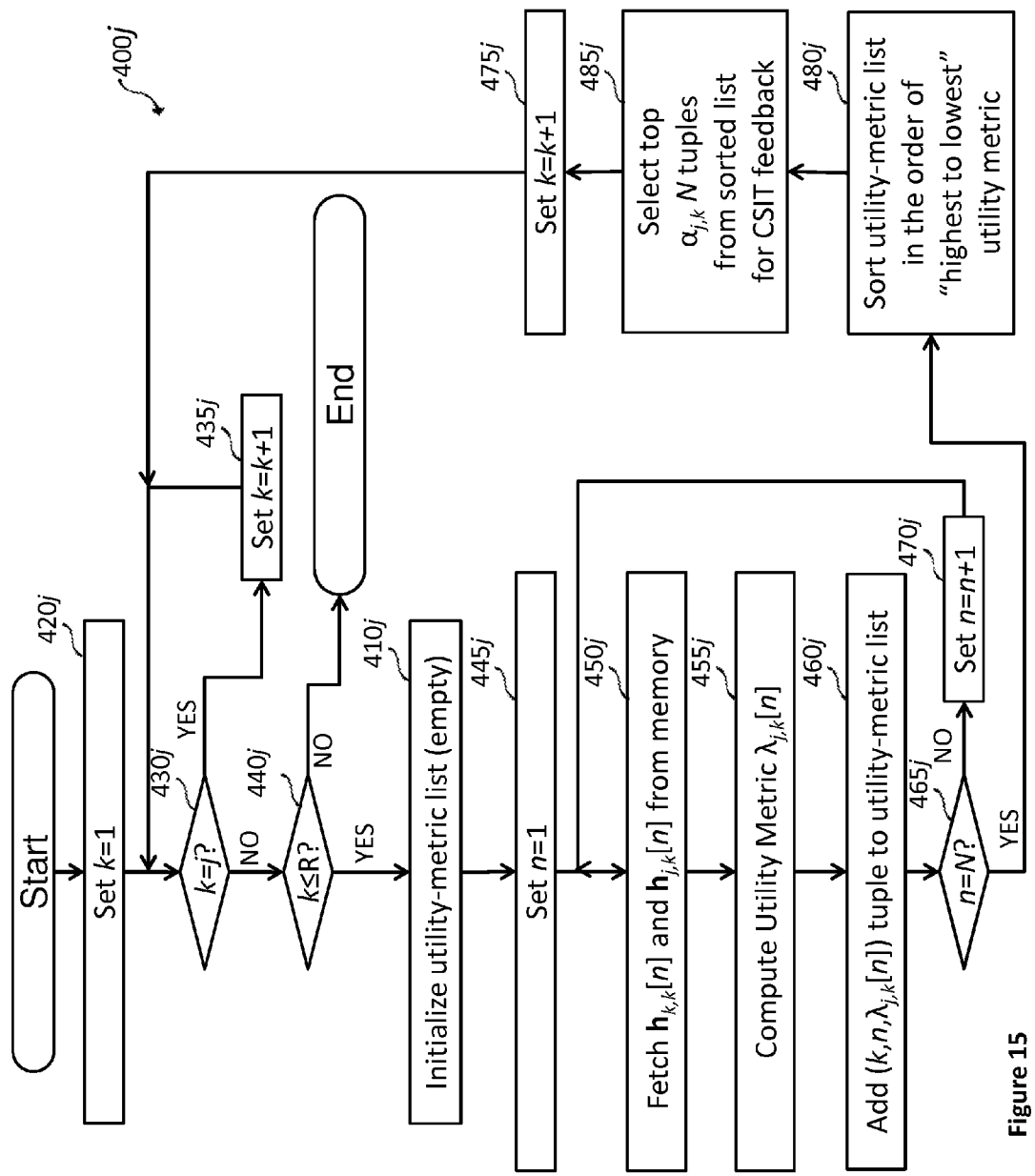
FIG. 15 is a flow diagram of one embodiment of a process for sending user-terminal based selective eavesdropper CSIT feedback at a UE.

FIG. 15 is a flow diagram of one embodiment of a process for feeding back UE-based selective eavesdropper CSIT feedback at UE j, where the fraction of the channels selected for CSIT feedback depends on the index of the intended UE (the UE for which a round-1 message was intended for). The process is performed by processing logic that may comprise hardware (circuitry, dedicated logic, etc.), software (such as is run on a general purpose computer system or a dedicated machine), or a combination of both.

In FIG. 15, UE j selects the best (according to a utility metric) $\alpha_{j,k}N$ channels out of the N channels that the UE has experienced during the transmission of N messages intended for user k, and for each k≠j.

Referring to FIG. 15, the process begins by processing logic in UE j setting the intended user index k equal to 1 (processing block 420j). Then UE j checks whether k equals j (processing block 430j). In the event that k equals j, UE j increments the value of k by 1 (processing block 435j) and returns to perform processing block 430j again. In the event that k does not equal j, processing logic in UE j checks whether or not the maximum value of k has been exceeded (processing block 440j).

If the maximum value of k=R has been exceeded, the process terminates. If the maximum value of k=R has not been exceeded, however, processing logic in UE j initializes its utility-metric list as the empty list (processing block 410j), sets the user-packet index n equal to 1 (processing block 445j), fetches the intended-UE channel, $h_{k,k}[n]$, and its own (eavesdropper) channel, kk[n], from memory (processing block 450j), uses those channels to compute the associated utility metric (processing block 455j), and then appends the local list of utility metrics (processing block 460j).

Thereafter, processing logic in UE j checks to see if the maximum message index value, n=N, has been reached (processing block 465j). If not, processing logic in the UE increments the value of n by 1 (processing block 470j), and then proceeds in sequence through processing blocks 450j-465j. If instead, in processing block 465j, the maximum message index value, n=N, has been reached, processing logic in UE j sorts the messages of user k based on their utility metric (processing block 480j) and selects the top $\alpha_{j,k}N$ message indices for user k for CSIT feedback. Then processing logic in UE j increments the intended-user index value of k by 1 (processing block 475j) and returns to perform processing block 430j again. Once the maximum value of k=R has been exceeded (processing block 440j), processing logic in UE j terminates its selection process and UE j proceeds to schedule its channels during the transmission of the selected $\alpha_{j,k}N$ message indices for user k for each k≠n, for CSI feedback via uplink transmission.

Such UE-specific embodiments allow more control in performance/CSIT-overhead trade-offs that can be enabled by the invention. Consider for instance two UEs, k and m, and assume the average number of eavesdroppers available (or eavesdroppers able to provide CSIT feedback) during the transmission of messages intended for UEs, k and m may be user specific. That is, there is an $R_m$ and an $R_k$ value, and $R_m \neq R_k$. Without loss of generality, consider the case $R_m > R_k$. Then, optimal the value of a is user-terminal specific, i.e., there is two vales $\alpha_k$ and $\alpha_m$, and we have $\alpha_k > \alpha_m$. In one embodiment, the base station signals to each UE j whether or not it is an eavesdropper for UE k. In one embodiment, UE j sets $\alpha_{j,k} = \alpha_k$, and $\alpha_{j,k} = 0$, if the UE j is not required to sent eavesdropper CSIT feedback on messages intended for UE k. In one embodiment $a_{j,k}$'s are computed at terminal j, based on information broadcasted by the base station (e.g., the desired $\alpha_k$'s) and locally available information on the UE j. Consider for instance the case, where N is eavesdropper-UE/intended-UE specific, i.e. where $N_{j,k}$ denotes the number of messages for user k on which UE j has available its own (eavesdropper) CSI available for feedback, and $N_{j,k}$ depends on j and k. This locally available information at terminal j can be used in conjunction with information broadcasted by the base station (e.g., the desired $\alpha_k$'s) to determine at UE j values for its set of $\{\alpha_{j,k}\}_{k \neq j}$.

Embodiments of the invention have one or more of the following advantages:
1) It enables efficient CSIT dissemination for enabling MU-MIMO based on outdated CSI. Many of the embodiments are not possible in conventional MU-MIMO due to the stringent timing requirements in delivering CSIT.
2) It enables efficient CSIR dissemination for enabling MU-MIMO based on outdated CSI. It allows higher efficiency CSIR dissemination than pure broadcasting.
3) For the case that UEs can also listen in the uplink during CSIT feedback transmissions by other UEs, the invention also allows efficient dissemination of CSIT while also providing partial CSIR dissemination to uplink-listening UEs, to be used in conjunction with further DL CSIR transmissions. These methods allow lowering further the number of transmission DL dimensions for CSIR dissemination.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method of disseminating channel state information (CSI) coefficients from a first user terminal, each CSI coefficient corresponding to the CSI previously observed by the first user terminal during transmission resource blocks used by a base station to communicate information to a second set comprising at least one user terminal and not including the first user terminal, the method comprising:
   broadcasting, by the base station, the channel state information (CSI) of each user terminal in the second set of user terminals, on the subset of transmission resources used by the base station to communicate information to each user terminal in the second set;
   receiving, by the first user terminal, observations of the transmissions of CSI;
   performing, at first user terminal, eavesdropper channel selection of a subset of CSI coefficients between the base station and the eavesdropping first-user terminal for uplink CSI feedback, the subset chosen out of the set of CSI coefficients between the base station and the first user-terminal on the transmission resources used by the base station to communicate information to each user terminal in the second set, wherein performing eavesdropper channel selection for uplink CSI feedback comprises performing a scheduling decision at the first user terminal by applying a selection algorithm to choose and transmit a fraction of the CSI coefficients based on whether or not the first user terminal is an eavesdropper of sufficient quality for a user terminal in the second set;
   scheduling the subset of the selected CSI coefficients for uplink transmission; and
   transmitting the subset of the selected CSI coefficients via the uplink transmission.

2. The method defined in claim 1 wherein performing the scheduling decision at the first user terminal further comprises ranking the CSI of the first user terminal and selecting the subset of the CSI coefficients based on the ranking.

3. The method defined in claim 2 wherein ranking the CSI comprises ordering the CSI of the first user terminal based on a quality metric.

4. The method defined in claim 3 wherein the quality metric is based on a mutual information increase that would be provided to an intended receiver if the CSI coefficients for the message were made available to the intended receiver.

5. The method defined in claim 1 wherein performing the scheduling decision at the first user terminal by applying a selection algorithm to choose and transmit a fraction of the CSI coefficients is based on knowledge of the CSI coefficients of the first user terminal and the CSI of at least one user terminal in the second set.

6. The method defined in claim 1 further comprising, performing, by the base station, downlink transmissions to broadcast the subset of the selected CSI coefficients back to user terminals in the set of user terminals.

7. The method defined in claim 1 wherein the fraction is specific to the first user terminal and specific to a user terminal in the second set of user terminals.

8. A wireless communication system comprising:
   a base station; and
   a plurality of user terminals, including a first user terminal and a second set of user terminals that do not include the first user terminal, wherein the first user terminal provides channel state information (CSI) coefficients to the base station, each CSI coefficient corresponding to the CSI previously observed by the first user terminal during transmission resource blocks used by the base station to communicate information to one or more user terminals in the second set,
   wherein the base station is operable to broadcast the channel state information (CSI) of each user terminal in the second set of user terminals, on the subset of transmission resources used by the base station to communicate information to each user terminal in the second set;
   and further wherein the first user terminal is operable to
      receive observations of the channel state information (CSI) of each user terminal in the second set of user terminals broadcasted by the base station,
      perform eavesdropper channel selection of a subset of CSI coefficients between the base station and the eavesdropping first-user terminal for uplink CSI feedback, where the subset is chosen by the first user terminal out of the set of CSI coefficients between the base station and the first user-terminal on the transmission resources used by the base station to communicate information to each user terminal in the second set, wherein the first user terminal is operable to perform eavesdropper channel selection for uplink CSI feedback by performing a scheduling decision at the first user terminal including applying a selection algorithm to choose and transmit a fraction of the CSI coefficients based on whether or not the first user terminal is an eavesdropper of sufficient quality for a user terminal in the second set, schedule the subset of the selected CSI coefficients for uplink transmission, and transmit the subset of the selected CSI coefficients via the uplink transmission.

9. The system defined in claim 8 wherein the first user terminal is operable to perform the scheduling decision at the first user terminal further by ranking the CSI of the first user terminal and selecting the subset of the CSI coefficients based on the ranking.

10. The system defined in claim 9 wherein the first user terminal is operable to rank the CSI by ordering the CSI of the first user terminal based on a quality metric.

11. The system defined in claim 10 wherein the quality metric is based on a mutual information increase that would be provided to an intended receiver if the CSI coefficients for the message were made available to the intended receiver.

12. The system defined in claim 8 wherein the first user terminal is operable to perform the scheduling decision at the first user terminal by applying a selection algorithm to choose and transmit a fraction of the CSI coefficients based on knowledge of the CSI coefficients of the first user terminal and the CSI of at least one user terminal in the second set.

13. The system defined in claim 8 wherein the base station is operable to perform downlink transmissions to broadcast the subset of the selected CSI coefficients back to user terminals in the set of user terminals.

14. The system defined in claim 8 wherein the fraction is specific to the first user terminal and specific to a user terminal in the second set of user terminals.

15. A method for transmitting information in a multi-user (MU)-MIMO wireless communication system having a multi-antenna transmitter and a plurality of user terminals, the method comprising:

performing a set of transmissions over distinct time-frequency blocks, wherein each transmission in the set of transmissions is intended to one or more user terminals;

eavesdropping, by at least two user terminals, transmissions in the set of transmissions;

sending, during a subsequent time-frequency block that is after the distinct time-frequency blocks, a pilot from each of the at least two user terminals to a base station to train antennas at the base station;

simultaneously transmitting, by the at least two user terminals during the subsequent time-frequency block, channel state information corresponding to the round-1 transmissions eavesdropped by the at least two user terminals, the channel state information being channel estimates obtained by the at least two user terminals eavesdropping the round-1 transmissions, wherein the channel state information from one user terminal in the at least two user terminals is for at least one other user terminal in the at least two user terminals; and obtaining, by each of the at least two user terminals, estimates on channels between base-station and its respective user terminal.

16. The method defined in claim 15 wherein the channel state information from one of the at least one user terminals is for at least one user terminal that is not in the at least two user terminals.

17. The method defined in claim 15 wherein the channel state information from one of the at least one user terminals is for both another user terminal of the at least two user terminals and at least one user terminal that is not in the at least two user terminals.

18. The method defined in claim 15 wherein the channel state information from each of the at least two user terminals is for a user terminal that is not in the at least two user terminals.

19. The method defined in claim 16 further comprising eavesdropping the simultaneous transmission to the base station from the at least two user terminals to obtain a single linear combination of two coefficients used to acquire CSIR for decoding by the user terminal that is not in the at least two user terminals.

20. A multi-user (MU)-MIMO wireless communication system comprising:

a base station with a multi-antenna transmitter; and a plurality of user terminals, including a first user terminal, wherein the base station is operable to perform a set of transmissions over distinct time-frequency blocks, wherein each transmission in the set of transmissions is intended to one or more user terminals;

and further wherein at least two user terminals are operable to:

eavesdrop transmissions in the set of transmissions and send, during a subsequent time-frequency block that is after the distinct time-frequency blocks, a pilot from each of the at least two user terminals to the base station to train antennas at the base station, simultaneously transmit, during the subsequent time-frequency block, channel state information corresponding to the round-1 transmissions eavesdropped by the at least two user terminals, the channel state information being channel estimates obtained by the at least two user terminals eavesdropping the round-1 transmissions, wherein the channel state information from one user terminal in the at least two user terminals is for at least one other user terminal in the at least two user terminals, and obtaining, by end of the at least two user terminals, estimates on channels between base-station and its respective user terminal.

21. The system defined in claim 20 wherein the channel state information from one of the at least one user terminals is for at least one user terminal that is not in the at least two user terminals.

22. The system defined in claim 20 wherein the channel state information from one of the at least one user terminals is for both another user terminal of the at least two user terminals and at least one user terminal that is not in the at least two user terminals.

23. The system defined in claim 20 wherein the channel state information from each of the at least two user terminals is for a user terminal that is not in the at least two user terminals.

24. The system defined in claim 21 wherein another user terminal in the plurality of user terminals, different from the at last two user terminals, is operable to eavesdrop the simultaneous transmission to the base station from the at least two user terminals to obtain a single linear combination of two coefficients used to acquire CSIR for decoding by the user terminal that is not in the at least two user terminals.

* * * * *